(12) United States Patent
Gueziec

(10) Patent No.: US 8,358,222 B2
(45) Date of Patent: Jan. 22, 2013

(54) GPS-GENERATED TRAFFIC INFORMATION

(75) Inventor: Andre Gueziec, Sunnyvale, CA (US)

(73) Assignee: Triangle Software, LLC, Campbell, CA (US)

( * ) Notice: Subject to any disclaimer, the term of this patent is extended or adjusted under 35 U.S.C. 154(b) by 0 days.

(21) Appl. No.: 12/967,045

(22) Filed: Dec. 13, 2010

(65) Prior Publication Data

US 2011/0169660 A1 Jul. 14, 2011

Related U.S. Application Data

(60) Continuation of application No. 12/482,285, filed on Jun. 10, 2009, now Pat. No. 7,880,642, which is a continuation of application No. 11/751,628, filed on May 21, 2007, now Pat. No. 7,557,730, which is a continuation of application No. 11/302,418, filed on (Continued)

(51) Int. Cl.
*G08G 1/09* (2006.01)

(52) U.S. Cl. ........ 340/905; 340/906; 340/907; 340/994; 340/995.24; 340/995.27; 701/117

(58) Field of Classification Search .................. 340/905, 340/906, 907, 994, 995.24, 995.27; 701/117, 701/200, 201, 204
See application file for complete search history.

(56) References Cited

U.S. PATENT DOCUMENTS

| 4,734,863 | A | 3/1988 | Honey et al. |
|---|---|---|---|
| 4,788,645 | A | 11/1988 | Zavoli et al. |
| 4,792,803 | A | 12/1988 | Madnick et al. |
| 4,796,191 | A | 1/1989 | Honey et al. |
| 4,878,170 | A | 10/1989 | Zeevi |
| 4,914,605 | A | 4/1990 | Loughmiller, Jr. et al. |
| 4,926,343 | A | 5/1990 | Tsuruta et al. |
| 5,068,656 | A | 11/1991 | Sutherland |
| 5,095,532 | A | 3/1992 | Mardus |
| 5,126,941 | A | 6/1992 | Gurmu et al. |
| 5,164,904 | A | 11/1992 | Sumner |
| 5,173,691 | A | 12/1992 | Sumner |
| 5,182,555 | A | 1/1993 | Sumner |
| 5,247,439 | A | 9/1993 | Gurmu et al. |
| 5,262,775 | A | 11/1993 | Tamai et al. |
| 5,276,785 | A | 1/1994 | Mackinlay et al. |
| 5,283,575 | A | 2/1994 | Kao et al. |
| 5,291,412 | A | 3/1994 | Tamai et al. |
| 5,291,413 | A | 3/1994 | Tamai et al. |

(Continued)

FOREIGN PATENT DOCUMENTS

| DE | 19856704 A1 | 6/2001 |
|---|---|---|
| EP | 0 987 665 A2 | 3/2000 |

(Continued)

OTHER PUBLICATIONS

Texas Transportation Institute, "2002 Urban Mobility Study: 220 Mobility Issues and Measures: The Effects of Incidents—Crashes and Vehicle Breakdowns" (2002).

(Continued)

*Primary Examiner* — Tai T Nguyen
(74) *Attorney, Agent, or Firm* — Lewis and Roca LLP

(57) ABSTRACT

Disclosed herein is a traveler information monitoring and dissemination system. The system disclosed herein provides real time information to a traveler, wherein the real time information may be pre-selected by the traveler. The system ensures consistent and quality data are produced and issued to the traveler.

15 Claims, 16 Drawing Sheets

Related U.S. Application Data

Dec. 12, 2005, now Pat. No. 7,221,287, which is a continuation-in-part of application No. 11/253,301, filed on Oct. 17, 2005, now Pat. No. 7,161,497, which is a division of application No. 10/379,967, filed on Mar. 5, 2003, now Pat. No. 6,989,765.

(60) Provisional application No. 60/362,155, filed on Mar. 5, 2002, provisional application No. 60/634,951, filed on Dec. 10, 2004, provisional application No. 60/658,312, filed on Mar. 3, 2005, provisional application No. 60/694,742, filed on Jun. 28, 2005.

U.S. PATENT DOCUMENTS

| Patent No. | | Date | Inventor |
|---|---|---|---|
| 5,291,414 | A | 3/1994 | Tamai et al. |
| 5,297,028 | A | 3/1994 | Ishikawa |
| 5,297,049 | A | 3/1994 | Gurmu et al. |
| 5,303,159 | A | 4/1994 | Tamai et al. |
| 5,311,195 | A | 5/1994 | Mathis et al. |
| 5,311,434 | A | 5/1994 | Tamai |
| 5,339,246 | A | 8/1994 | Kao |
| 5,343,400 | A | 8/1994 | Ishikawa |
| 5,345,382 | A | 9/1994 | Kao |
| 5,359,529 | A | 10/1994 | Snider |
| 5,374,933 | A | 12/1994 | Kao |
| 5,377,113 | A | 12/1994 | Shibazaki et al. |
| 5,390,123 | A | 2/1995 | Ishikawa |
| 5,394,333 | A | 2/1995 | Kao |
| 5,402,120 | A | 3/1995 | Fujii et al. |
| 5,414,630 | A | 5/1995 | Oshizawa et al. |
| 5,430,655 | A | 7/1995 | Adachi |
| 5,440,484 | A | 8/1995 | Kao |
| 5,477,220 | A | 12/1995 | Ishikawa |
| 5,488,559 | A | 1/1996 | Seymour |
| 5,508,931 | A | 4/1996 | Snider |
| 5,515,283 | A | 5/1996 | Desai et al. |
| 5,515,284 | A | 5/1996 | Abe |
| 5,546,107 | A | 8/1996 | Deretsky et al. |
| 5,548,822 | A | 8/1996 | Yogo |
| 5,550,538 | A | 8/1996 | Fujii et al. |
| 5,554,845 | A | 9/1996 | Russell |
| 5,608,635 | A | 3/1997 | Tamai |
| 5,610,821 | A | 3/1997 | Gazis et al. |
| 5,694,534 | A | 12/1997 | White, Jr. et al. |
| 5,699,056 | A | 12/1997 | Yoshida |
| 5,706,503 | A | 1/1998 | Poppen et al. |
| 5,712,788 | A | 1/1998 | Liaw et al. |
| 5,729,458 | A | 3/1998 | Poppen |
| 5,731,978 | A | 3/1998 | Tamai et al. |
| 5,751,245 | A | 5/1998 | Janky et al. |
| 5,757,359 | A | 5/1998 | Morimoto et al. |
| 5,774,827 | A | 6/1998 | Smith, Jr. et al. |
| 5,818,356 | A | 10/1998 | Schuessler |
| 5,845,227 | A | 12/1998 | Peterson |
| 5,850,190 | A * | 12/1998 | Wicks et al. ............ 340/905 |
| 5,862,244 | A | 1/1999 | Kleiner et al. |
| 5,862,509 | A | 1/1999 | Desai et al. |
| 5,893,081 | A | 4/1999 | Poppen |
| 5,893,898 | A | 4/1999 | Tanimoto |
| 5,898,390 | A | 4/1999 | Oshizawa et al. |
| 5,902,350 | A | 5/1999 | Tamai et al. |
| 5,904,728 | A | 5/1999 | Tamai et al. |
| 5,910,177 | A | 6/1999 | Zuber |
| 5,912,635 | A | 6/1999 | Oshizawa et al. |
| 5,916,299 | A | 6/1999 | Poppen |
| 5,922,042 | A | 7/1999 | Sekine et al. |
| 5,928,307 | A | 7/1999 | Oshizawa et al. |
| 5,933,100 | A | 8/1999 | Golding |
| 5,938,720 | A | 8/1999 | Tamai |
| 5,948,043 | A | 9/1999 | Mathis |
| 5,978,730 | A | 11/1999 | Poppen et al. |
| 5,982,298 | A | 11/1999 | Lappenbusch et al. |
| 5,987,381 | A | 11/1999 | Oshizawa |
| 5,999,882 | A | 12/1999 | Simpson et al. |
| 6,011,494 | A | 1/2000 | Watanabe et al. |
| 6,016,485 | A | 1/2000 | Amakawa et al. |
| 6,021,406 | A | 2/2000 | Kuznetsov |
| 6,038,509 | A | 3/2000 | Poppen et al. |
| 6,058,390 | A | 5/2000 | Liaw et al. |
| 6,091,359 | A | 7/2000 | Geier |
| 6,091,956 | A | 7/2000 | Hollenberg |
| 6,097,399 | A | 8/2000 | Bhatt et al. |
| 6,111,521 | A | 8/2000 | Mulder et al. |
| 6,144,919 | A | 11/2000 | Ceylan et al. |
| 6,147,626 | A | 11/2000 | Sakakibara |
| 6,161,092 | A | 12/2000 | Latshaw et al. |
| 6,169,552 | B1 | 1/2001 | Endo et al. |
| 6,188,956 | B1 | 2/2001 | Walters |
| 6,209,026 | B1 | 3/2001 | Ran et al. |
| 6,222,485 | B1 | 4/2001 | Walters et al. |
| 6,236,933 | B1 | 5/2001 | Lang |
| 6,253,146 | B1 | 6/2001 | Hanson et al. |
| 6,253,154 | B1 | 6/2001 | Oshizawa et al. |
| 6,256,577 | B1 | 7/2001 | Graunke |
| 6,259,987 | B1 | 7/2001 | Ceylan et al. |
| 6,282,496 | B1 | 8/2001 | Chowdhary |
| 6,292,745 | B1 | 9/2001 | Robare et al. |
| 6,297,748 | B1 | 10/2001 | Lappenbusch et al. |
| 6,298,305 | B1 | 10/2001 | Kadaba et al. |
| 6,317,685 | B1 | 11/2001 | Kozak et al. |
| 6,317,686 | B1 | 11/2001 | Ran |
| 6,353,795 | B1 | 3/2002 | Ranjan |
| 6,360,165 | B1 | 3/2002 | Chowdhary |
| 6,362,778 | B2 | 3/2002 | Neher |
| 6,415,291 | B2 | 7/2002 | Bouve et al. |
| 6,424,910 | B1 | 7/2002 | Ohler et al. |
| 6,456,931 | B1 | 9/2002 | Polidi et al. |
| 6,456,935 | B1 | 9/2002 | Ng |
| 6,463,400 | B1 | 10/2002 | Barkley-Yeung |
| 6,470,268 | B1 | 10/2002 | Ashcraft et al. |
| 6,504,541 | B1 | 1/2003 | Liu et al. |
| 6,529,143 | B2 | 3/2003 | Mikkola et al. |
| 6,532,304 | B1 | 3/2003 | Liu et al. |
| 6,539,302 | B1 | 3/2003 | Bender et al. |
| 6,542,814 | B2 | 4/2003 | Polidi et al. |
| 6,552,656 | B2 | 4/2003 | Polidi et al. |
| 6,559,865 | B1 | 5/2003 | Angwin |
| 6,598,016 | B1 | 7/2003 | Zavoli et al. |
| 6,600,994 | B1 | 7/2003 | Polidi |
| 6,603,405 | B2 | 8/2003 | Smith |
| 6,622,086 | B2 | 9/2003 | Polidi |
| 6,650,997 | B2 | 11/2003 | Funk |
| 6,681,176 | B2 | 1/2004 | Funk et al. |
| 6,687,615 | B1 | 2/2004 | Krull et al. |
| 6,700,503 | B2 | 3/2004 | Masar et al. |
| 6,710,774 | B1 | 3/2004 | Kawasaki et al. |
| 6,728,628 | B2 | 4/2004 | Peterson |
| 6,731,940 | B1 | 5/2004 | Nagendran |
| 6,735,516 | B1 | 5/2004 | Manson |
| 6,754,833 | B1 | 6/2004 | Black et al. |
| 6,791,472 | B1 | 9/2004 | Hoffberg |
| 6,807,483 | B1 | 10/2004 | Chao et al. |
| 6,845,316 | B2 | 1/2005 | Yates |
| RE38,724 | E | 4/2005 | Peterson |
| 6,885,937 | B1 | 4/2005 | Suranyi |
| 6,901,330 | B1 | 5/2005 | Krull et al. |
| 6,922,629 | B2 | 7/2005 | Yoshikawa et al. |
| 6,952,643 | B2 | 10/2005 | Matsuoka et al. |
| 6,965,665 | B2 | 11/2005 | Fan et al. |
| 6,989,765 | B2 | 1/2006 | Gueziec |
| 6,999,873 | B1 | 2/2006 | Krull et al. |
| 7,062,378 | B2 | 6/2006 | Krull et al. |
| 7,069,143 | B2 | 6/2006 | Peterson |
| 7,103,854 | B2 | 9/2006 | Fuchs et al. |
| 7,221,287 | B2 | 5/2007 | Gueziec et al. |
| 7,588,674 | B2 | 9/2009 | Neilley et al. |
| 7,610,145 | B2 | 10/2009 | Kantarjiev et al. |
| 7,634,352 | B2 | 12/2009 | Soulchin et al. |
| 7,702,452 | B2 | 4/2010 | Kantarjiev et al. |
| 2001/0014848 | A1 | 8/2001 | Walgers et al. |
| 2001/0026276 | A1 | 10/2001 | Sakamoto et al. |
| 2001/0033225 | A1 | 10/2001 | Razavi et al. |
| 2001/0047242 | A1 | 11/2001 | Ohta |
| 2002/0042819 | A1 | 4/2002 | Reichert et al. |
| 2002/0077748 | A1 | 6/2002 | Nakano |

| | | | |
|---|---|---|---|
| 2002/0152020 | A1 | 10/2002 | Seibel |
| 2002/0177947 | A1 | 11/2002 | Cayford |
| 2003/0135304 | A1 | 7/2003 | Sroub et al. |
| 2003/0182052 | A1 | 9/2003 | DeLorme et al. |
| 2004/0046759 | A1 | 3/2004 | Soulchin et al. |
| 2004/0107288 | A1 | 6/2004 | Menninger et al. |
| 2004/0143385 | A1 | 7/2004 | Smyth et al. |
| 2004/0249568 | A1 | 12/2004 | Endo et al. |
| 2005/0021225 | A1 | 1/2005 | Kantarjiev et al. |
| 2005/0143902 | A1 | 6/2005 | Soulchin et al. |
| 2006/0122846 | A1 | 6/2006 | Burr et al. |
| 2006/0145892 | A1 | 7/2006 | Gueziec |
| 2006/0158330 | A1 | 7/2006 | Gueziec |
| 2007/0222750 | A1 | 9/2007 | Ohta |
| 2009/0118996 | A1 | 5/2009 | Kantarjiev et al. |

FOREIGN PATENT DOCUMENTS

| | | |
|---|---|---|
| EP | 1 006 367 | 6/2000 |
| GB | 2 400 293 | 10/2004 |
| JP | 05-313578 A | 11/1993 |
| JP | 10-261188 A | 9/1998 |
| JP | 10-281782 A | 10/1998 |
| JP | 10-293533 A | 11/1998 |
| JP | 2000-055675 A | 2/2000 |
| JP | 2000-113387 A | 4/2000 |
| WO | WO 00/50917 | 8/2000 |
| WO | 0188480 A1 | 11/2001 |
| WO | 03014671 A1 | 2/2003 |
| WO | WO 2005/076031 | 8/2005 |

OTHER PUBLICATIONS

Yim et al., "TravInfo Field Operational Test Evaluation: Information Service Providers Customer Survey" (2000).
Goldberg et al., "Computing the Shortest Path: A* Search Meets Graph Theory," Microsoft Research, Technical Report MSR-TR-2004-Mar. 24, 2003.
Gueziec, Andre, "3D Traffic Visualization in Real Time," ACM Siggraph Technical Sketches,,Conference Abstracts and Applications, p. 144, Los Angeles, CA, Aug. 2001.
Goldberg et al., "Computing the Shortest Path: A* Search Meets Graph Theory," Proc. of the 16th Annual ACM-SIAM Sym. on Discrete Algorithms, Jan. 23-25, 2005. Vancouver, BC.
Hankey, et al., "In-Vehicle Information Systems Behavioral Model and Design Support: Final Report," Feb. 16, 2000, Publication No. 00-135, Research, Development, and Technology, Turner-Fairbank Highway Research Center, McLean, Virginia.
Adib Kanafani, "Towards a Technology Assessment of Highway Navigation and Route Guidance," Program on Advanced Technology for the Highway, Institute of Transportation Studies, University of California, Berkeley, Dec. 1987, Path Working Paper UCB-ITS-PWP-87-6.
Barnaby J. Feder, "Talking Deals; Big Partners in Technology," Technology, The New York Times, Sep. 3, 1987.
Brooks, et al., "Turn-by-Turn Displays versus Electronic Maps: An On-the-Road Comparison of Driver Glance Behavior," Technical Report, The University of Michigan, Transportation Research Institute (UMTRI), Jan. 1999.
WSI, "TrueView Interactive Training Manual, Showfx Student Guide," Print Date: Sep. 2004, Document Version: 4.3x. Link: http://apollo.lsc.vsc.edu/intranet/WSI_Showfx/training/970-TVSK-SG-43.pdf.
Garmin's Preliminary Invalidity Contentions and Certificate of Service filed May 16, 2011 in *Triangle Software, LLC.* v. *Garmin International, Inc.* et al., Case No. 1: 10-cv-1457-CMH-TCB in the United States District Court for the Eastern District of Virginia, Alexandria Division, 46 pages.
Attachment A of Garmin's Preliminary Invalidity Contentions and Certificate of Service filed May 16, 2011 in *Triangle Software, LLC.* v. *Garmin International, Inc.* et al., Case No. 1: 10-cv-1457-CMH-TCB in the United States District Court for the Eastern District of Virginia, Alexandria Division, 6 pages.
Attachment B of Garmin's Preliminary Invalidity Contentions and Certificate of Service filed May 16, 2011 in *Triangle Software, LLC.* v. *Garmin International, Inc.* et al., Case No. 1: 10-cv-1457-CMH-TCB in the United States District Court for the Eastern District of Virginia, Alexandria Division, 618 pages.
Preliminary Invalidity Contentions of Defendant TomTom, Inc., Certificate of Service and Exhibit A filed May 16, 2011 in *Triangle Software, LLC.* v. *Garmin International, Inc.* et al., Case No. 1: 10-cv-1457-CMH-TCB in the United States District Court for the Eastern District of Virginia, Alexandria Division, 354 pages.
Acura Debuts AcuraLink™ Satellite-Linked Communication System with Industry's First Standard Real Time Traffic Feature at New York International Auto Show, 2004, 4 pages.
Burgett, A. L.,"Safety Evaluation of TravTek," Vehicle Navigation & Information Systems Conference Proceedings (VNIS'91), P-253, Part 1, Oct. 1991, pp. 819-825, Soc. of Automotive Engineers, Inc., Warrendale, PA, USA.
de Cambray, B. "Three-Dimensional (3D) Modelling in a Geographical Database," Auto-Carto'11, Eleventh International Conference on Computer Assisted Cartography, Oct. 30, 1993-Nov. 1, 1993, pp. 338-347, Minneapolis, USA.
Campbell, J. L., "Development of Human Factors Design Guidelines for Advanced Traveler Information Systems (ATIS)", Proceedings Vehicle Navigation and Information Systems Conference, 1995, pp. 161-164, IEEE, New York, NY, USA.
Campbell, J. L., "Development of Human Factors Design Guidelines for Advanced Travel Information Systems (ATIS) and Commercial Vehicle Operations (CVO)", Publication No. FHWA-RD-98-057, Report Date Sep. 1998, 294, pages, U.S. Department of Transportation, McLean, VA 22010-2296.
Cathey, F.W. et al., "A Prescription for Transit Arrival/Departure Prediction Using Automatic Vehicle Location Data," Transportation Research Part C 11, 2003, pp. 241-264, Pergamon Press Ltd., Elsevier Ltd., U.K.
Chien, S. I. et al., "Predicting Travel Times for the South Jersey Real-Time Motorist Information System," Transportation Research Record 1855, Paper No. 03-2750, Revised Oct. 2001, pp. 32-40.
Chira-Chavala, T. et al. "Feasibility Study of Advanced Technology HOV Systems," vol. 3: Benefit Implications of Alternative Policies for Including HOV lanes in Route Guidance Networks, Dec. 1992, 84 pages, UCB-ITS-PRR-92-5 PATH Research Report, Inst. of Transportation Studies, Univ. of Calif., Berkeley, USA.
Clark. E.L., Development of Human Factors Guidelines for Advanced Traveler Information Systems (ATIS) and Commercial Vehicle Operations (CVO): Comparable Systems Analysis, Dec. 1996, 199 pages.
Davies, P. et al., "Assessment of Advanced Technologies for Relieving Urban Traffic Congestion," National Cooperative Highway Research Program Report 340, Dec. 1991, 106 pages.
Dillenburg, J.F. et al., "The Intelligent Travel Assistant," IEEE 5th International Conference on Intelligent Transportation Systems, Sep. 3-6, 2002, pp. 691-696, Singapore.
Dingus, T.A. et al., "Human Factors Engineering the TravTek Driver Interface," Vehicle Navigation & Information Systems Conference Proceedings (VNIS'91), P-253, Part 2, Oct. 1991, pp. 749-755, Soc. of Automotive Engineers, Inc., Warrendale, PA, USA.
Eppinger, A. et al., "Dynamic Route Guidance—Status and Trends," Convergence 2000 International Congress on Transportation Electronics, Oct. 16-18, 1999, 7 pages, held in Detroit, MI, SAE International Paper Series, Warrendale, PA, USA.
Fleischman, R.N., "Research and Evaluation Plans for the TravTek IVHS Operational Field Test," Vehicle Navigation & Information Systems Conference Proceedings (VNIS'91), P-253, Part 2, Oct. 1991, pp. 827-837, Soc. of Automotive Engineers, Inc., Warrendale, PA, USA.
GM Exhibits Prototype of Travtek Test Vehicle, Inside IVHS, Oct. 28, 1991, V. 1, No. 21, 2 pages.
Golisch, F., Navigation and Telematics in Japan, International Symposium on Car Navigation Systems, May 21, 1997, 20 pages, held in Barcelona, Spain.
Gueziec, A., "Architecture of a System for Producing Animated Traffic Reports," Mar. 30, 2001, 42 pages.
Handley, S. et al., "Learning to Predict the Duration of an Automobile Trip," Proceedings of the Fourth International Conference on Knowledge Discovery and Data Mining, 1998, 5 pages, AAAI Press, New York, NY, USA.

Hirata et al., "The Development of a New Multi-AV System Incorporating an On-Board Navigation Function," International Congress and Exposition, Mar. 1-5, 1993, pp. 1-12, held in Detroit, MI, SAE International, Warrendale, PA, USA.

Hoffmann, G. et al., Travel Times as a Basic Part of the LISB Guidance Strategy, Third International Conference on Road Traffic Control, May 1-3, 1990, pp. 6-10, London, U.K.

Hofmann, T. "2005 Acura RL Prototype Preview," Auto123.com, 4 pages.

Hu, Z. et al., "Real-time Data Fusion on Tracking Camera Pose for Direct Visual Guidance," IEEE Vehicles Symposium, Jun. 14-17, 2004, pp. 842-847, held in Parma, Italy.

Hulse, M.C. et al., "Development of Human Factors Guidelines for Advanced Traveler Information Systems and Commercial Vehicle Operations: Identification of the Strengths and Weaknesses of Alternative Information Display Formats," Publication No. FHWA-RD-96-142, Oct. 16, 1998, 187 pages, Office of Safety and Traffic Operation R&D, Federal Highway Administration, USA.

Jiang, G., "Travel-Time Prediction for Urban Arterial Road: A Case on China," Proceedings Intelligent Transportation Systems, Oct. 12-15, 2003, pp. 255-260, IEEE, New York, NY, USA.

Kopitz et al., Table of Contents, Chapter 6, Traffic Information Services, and Chapter 7, Intelligent Transport Systems and RDS-TMC in RDS: The Radio Data System, 1992, Cover p.-XV, pp. 107-167, Back Cover page, Artech House Publishers, Boston, USA and London, Great Britain.

Krage, M.K., "The TravTek Driver Information System," Vehicle Navigation & Information Systems Conference Proceedings (VNIS'91), P-253, Part 1, Oct. 1991, pp. 739-748, Soc. of Automotive Engineers, Inc., Warrendale, PA, USA.

Ladner, R. et al., "3D Mapping of an Interactive Synthetic Environment," Computing Practices, Mar. 2000, pp. 33-39, IEEE, New York, NY, USA.

Lowenau, J. et al., "Final Map Actualisation Requirements," Version 1.1, ActMAP Consortium, Sep. 30, 2004, 111 pages.

Meridian Series of GPS Receivers User Manual, Magellan, 2002, 106 pages, Thales Navigation, Inc., San Dimas, CA, USA.

Ness, M. et al, "A Prototype Low Cost In-Vehicle Navigation System," IEEE—IEE Vehicle Navigation & Information Systems Conference (VNIS), 1993, pp. 56-59, New York, NY, USA.

Noonan J. et al., "Intelligent Transportation Systems Field Operational Test Cross-Cutting Study Advanced Traveler Information Systems," Sep. 1998, 27 pages, U.S. Department of Transportation, McLean, VA, USA.

Odagaki et al., Automobile Navigation System with Multi-Source Guide Information, International Congress & Exposition, Feb. 24-28, 1992, pp. 97-105, SAE Inernational,Warrendale, PA, USA.

Raper, J.F. et al., "Three-Dimensional GIS," in Geographical Information Systems: Principles and Applications, 1991, vol. 1, Chapter 20, 21 pages.

Reference Manual for the Magellan RoadMate 500/700, 2003, 65 pages, Thales Navigation, Inc., San Dimas, CA, USA.

Riiett, L.R., "Simulating the TravTek Route Guidance Logic Using the Integration Traffic Model," Vehicle Navigation & Information System, P-253, Part 2, Oct. 1991, pp. 775-787, Soc. of Automotive Engineers, Inc., Warrendale, PA, USA.

Rillings, J. H., et al., "TravTek," Vehicle Navigation & Information System Conference Proceedings (VNIS'91), P-253, Part 2, Oct. 1991, pp. 729-737, Soc. of Automotive Engineers, Inc., Warrendale, PA, USA.

Rupert, R.L., "The TravTek Traffic Management Center and Traffic Information Network," Vehicle Navigation & Information System Conference Proceedings (VNIS'91), P-253, Part 1, Oct. 1991, pp. 757-761, Soc. of Automotive Engineers, Inc., Warrendale, PA, USA.

Schofer, J. L., "Behavioral Issues in the Design and Evaluation of Advanced Traveler Information Systems," Transportation Research Part C 1, 1993, pp. 107-117, Pergamon Press Ltd., Elsevier Science Ltd.

Schulz, W., "Traffic Management Improvement by Integrating Modern Communication Systems," IEEE Communications Magazine, Oct. 1996, pp. 56-60, New York, NY, USA.

Shepherd, I.D.H. et al., "Information Integration and GIS," in Geographical Information Systems: Principles and Applications, 1991, vol. 1, pp. Cover page, 337-360, end page.

Sirius Satellite Radio: Traffic Development Kit Start Up Guide, Sep. 27, 2005, Version 00.00.01, NY, New York, 14 pages.

Sumner, R. "Data Fusion in Pathfinder and TravTek," Part 1, Vehicle Navigation & Information Systems Conference Proceedings (VNIS '91), Oct. 1991, Cover & Title page, pp. 71-75.

Tamura et al., "Toward Realization of VICS—Vehicle Information and Communications System," IEEE—IEE Vehicle Navigation & Information Systems Conference (VNIS 93),1993, pp. 72-77, held in Ottawa, Canada.

Taylor, K.B., "TravTek—Information and Services Center," Vehicle Navigation & Information System Conference Proceedings (VNIS '91), P-253, Part 2, Oct. 1991, pp. 763-774, Soc. of Automotive Engineers, Inc., Warrendale, PA, USA.

Thompson S.M. et al., "Exploiting Telecommunications to Delivery Real Time Transport Information," Road Transport Information and Control, Conf. Publication No. 454, Apr. 21-23, 1998, pp. 59-63, IEE, U.K.

"The Challenge of VICS: The Dialog Between the Car and Road has Begun," Oct. 1, 1996, pp. 19-63, The Road Traffic Information Communication System Centre (VICS Centre), Tokyo, Japan.

Tonjes, R., "3d Reconstruction of Objects from Ariel Images Using a GIS," presented at ISPRS Workshops on "Theoretical and Practical Aspects of Surface Reconstructions and 3-D Object Extraction" Sep. 9-11, 1997, 8 pages, held in Haifa, Israel.

Levinson, D. et al., "Assessing the Benefits and C osts of Intelligent Transportation Systems: The Value of Advanced Traveler Information Systems," Publication UCB-ITS-PRR-99-20, California Path Program, Jul. 1999, Institute of Transportation Studies, University of California, Berkeley, CA, USA.

Balke, K.N. et al., "Advanced Technologies for Communicating with Motorists: A Synthesis of Human Factors and Traffic Management Issues," Report No. FHWA/TX-9211232-8, May 1992, Texas Department Transportation, Austin, TX, USA, 62 pages.

Fawcett, J. et. al, Adaptive Routing for Road Traffic, IEEE Computer Graphics and Applications, May/Jun. 2000, pp. 46-53, IEEE, New York, NY, USA.

Rillings, J.H. et al., "Advanced Driver Information Systems," IEEE Transactions on Vehicular Technology, Feb. 1991, vol. 40, No. 1, pp. 31-40, IEEE, New York, NY, USA.

Garmin International, Inc. and Garmin USA, Inc.'s Answer and Counterclaim to Triangle Software, LLC's Supplemental Complaint filed Jun. 17, 2011 in *Triangle Software, LLC* v. *Garmin International Inc.* et al., in the United States District Court for the Eastern District of Virginia, Alexandria Division, Case No. 1:10-cv-1457-CMH-TCB, 36 pages.

Initial Expert Report of William R. Michalson, PH. D. dated Jun. 17, 2011 in *Triangle Software, LLC* v. *Garmin International Inc.* et al., in the United States District Court for the Eastern District of Virginia, Alexandria Division, Case No. 1:10-cv-1457-CMH-TCB, 198 pages.

Supplemental Expert Report of William R. Michalson, PH. D. Regarding Invalidity of the Patents—in-Suit dated Jul. 5, 2011 in *Triangle Software, LLC* v. *Garmin International Inc.* et al., in the United States District Court for the Eastern District of Virginia, Alexandria Division, Case No. 1:10-cv-1457-CMH-TCB, 23 pages.

Initial Expert Report of Roy Summer dated Jun. 16, 2011 in *Triangle Software, LLC* v. *Garmin International Inc.* et al., in the United States District Court for the Eastern District of Virginia, Alexandria Division, Case No. 1:10-cv-1457-CMH-TCB, 289 pages.

Expert Report of Dr. Michael Goodchild Concerning the Validity of U.S. 5,938,720 dated Jun. 16, 2011 in *Triangle Software, LLC* v. *Garmin International Inc.* et al., in the United States District Court for the Eastern District of Virginia, Alexandria Division, Case No. 1:10-cv-1457-CMH-TCB, 16 pages.

Truett, R., "Car Navigation System May Live on After Test," The Orlando Sentinel, Feb. 17, 1993, p. 3 pages.

U.S. Dept. of Transportation, Closing the Data Gap: Guidelines for Quality Advanced Traveler Information System (ATIS) Data, Version 1.0, Sep. 2000, 41 pages.

Watanabe et al, "Development of a Three-dimensional Bird's-Eye View Map Drawing Technique for Car Navigation Systems," Society of Automotive Engineers, Inc., 1996, pp. 11-18.

Wischhof, L. et al., "SOTIS—A Self-Organizing Traffic Information System," Proceedings of the 57th IEEE Vehicular Technology Conference (VTC—'03), 2003, pp. 2442-2446, New York, NY, USA.

Yokouchi, K., "Car-Navigation Systems," Mitsubishi Electr. Adv. Technical Reports, 2000, vol. 91, pp. 10-14, Japan.

You, J. et al., "Development and Evaluation of a Hybrid Travel Time Forecasting Model," Transportation Research Part C 8, 2000, pp. 231-256, Pergamon Press Ltd., Elsevier Science Ltd., U.K.

Zhu, C. et al., "3D Terrain Visualization for Web GIS," Center for Advanced Media Technology, Nanyang Technological University, Singapore, 2003, 8 pages.

Audi-V150 Manual, Oct. 2001, 152 pages, Japan.

Birdview Navigation System by Nissan Motor Corp, 240 Landmarks of Japanese Automotive Technology, 1995, 2 pages, Society of Automotive Engineers of Japan, Inc., Japan.

Dancer, F. et al, "Vehicle Navigation Systems: Is America Ready?," Navigation and Intelligent Transportation Systems, Automotive Electronics Series, Society of Automotive Engineers, 1998, pp. Cover page, Table of Contents, pp. 3-8.

Endo et al., "Development and Evaluation of a Car Navigation System Providing a Birds Eye View Map Display," Navigation and Intelligent Transportation Systems, Automotive Electronics Series, Society of Automotive Engineers, 1998, pp. Cover page, Table of Contents, pp. 19-22.

Inman, V.W. et al., "TravTek Global Evaluation and Executive Summary," Publication No. FHWA-RD-96-031, Mar. 1996, 104 pages, U.S. Department of Transportation, McLean, VA, USA.

Inman, V.W. et al., "TravTek Evaluation Rental and Local User Study," Publication No. FHWA-RD-96-028, Mar. 1996, 110 pages, U.S. Department of Transportation, McLean, VA, USA.

Vollmer, R., "Navigation Systems—Intelligent Co-Drivers with Knowledge of Road and Tourist Information," Navigation and Intelligent Transportation Systems, Automotive Electronics Series, Society of Automotive Engineers, 1998, pp. Cover page, Table of Contents, pp. 9-17.

Blumentritt, K. et al., "TravTek System Architecture Evaluation," Publication No. FHWA-RD-96-141, Jul. 1995, 504 pages, U.S. Department of Transportation, McLean, VA, USA.

Zhao, Y. "Vehicle Location and Navigation Systems," 1997, 370 pages, Artech House, Inc., Norwood, MA, USA.

"Travtek Information and Services Center Policy/Procedures Manual," Feb. 1992, 133 pages, U.S. Department of Transportation, McLean, VA, USA.

XM Radio Introduces Satellite Update Service for Vehicle Navigation, Apr. 8, 2004, 2 pages.

Slothower, D., "Sketches & Applications," SIGGRAPH 2001, pp. 138-144, Stanford University.

Karbassi, A. et al., "Vehicle Route Prediction and Time of Arrival Estimation Techniques for Improved Transportation System Management," in Proceedings of the Intelligent Vehicles Symposium, 2003, pp. 511-516, IEEE, New York, NY, USA.

Koller, D. et al., "Virtual GIS: A Real-Time 3D Geographic Information System," Proceedings of the 6th IEEE Visualization Conference (Visualization '95) 1995, pp. 94-100, IEEE, New York, NY, USA.

\* cited by examiner

| | Name | Distance | Current Travel Time | Ideal Travel Time |
|---|---|---|---|---|
| ☐ | home 2 work | 11.6 mi. | 00:10:59 | 00:11:00 |
| ☐ | work 2 home | 11.6 mi. | 00:11:23 | 00:11:30 |
| ☐ | CA-85 | 14.2 mi. | 00:14:09 | 00:15:00 |
| ☐ | Sacramento | 80.4 mi. | 01:32:08 | 01:17:00 |
| ☐ | Sacramento(Reverse) | 112.0 mi. | 01:53:24 | 01:45:00 |
| ☐ | Union City | 22.0 mi. | 00:26:13 | 00:20:24 |
| ☐ | Seattle | 105.3 mi. | 02:52:21 | 01:47:35 |

700

710, 720, 730, 740

Create

FIGURE 7

BeatTheTraffic.com
*The right traffic, at the right time*™

Metro Area [Select an area... ▽]

Tell a friend about BeatTheTraffic.com | My Traffic | Subscribe | Feedback
 | Routes  Alerts | Devices | Option

Alerts

Device: [Cell ▽] — 1010

Route: [Home ▽] — 1020

Days: Su Mo Tu We Th Fr Sa
☐ ☐ ☑ ☑ ☑ ☑ ☐ — 1030

Start: [8 ▽] [00 ▽] [AM ▽] — 1040

End: [9 ▽] [00 ▽] [AM ▽]

Incidents: — 1050
- ⦿ Alert me of all incidents
- ○ Alert me of severe incidents only. (incidents blocking one or more lanes)
- ○ No incident alerts

Speed: ☑ Alert me if delays on my route exceed [15] minutes — 1060

[Save] [Cancel]

GPS-GENERATED TRAFFIC INFORMATION

CROSS REFERENCE TO RELATED APPLICATIONS

This application is a continuation and claims the priority benefit of U.S. patent application Ser. No. 12/482,285 filed Jun. 10, 2009 now U.S. Pat. No. 7,880,642 and entitled "GPS-Generated Traffic Information," which is a continuation and claims the priority benefit of U.S. patent application Ser. No. 11/751,628, which is now U.S. Pat. No. 7,557,730, filed May 21, 2007 and entitled "GPS-Generated Traffic Information," which is a continuation and claims the priority benefit of U.S. patent application Ser. No. 11/302,418, which is now U.S. Pat. No. 7,221,287, filed Dec. 12, 2005 and entitled "Three-Dimensional Traffic Report," which is a continuation-in-part and claims the priority benefit of U.S. patent application Ser. No. 11/253,301, which is now U.S. Pat. No. 7,161,497, filed Oct. 17, 2005 and entitled "Personalized Traveler Information Dissemination System," which is a divisional and claims the priority benefit of U.S. patent application Ser. No. 10/379,967, which is now U.S. Pat. No. 6,989,765, filed Mar. 5, 2003 and entitled "Personalized Traveler Information Dissemination System," which claims the priority benefit of U.S. provisional patent application No. 60/362,155 filed Mar. 5, 2002 and entitled "Personalized Road Traffic Information Dissemination"; U.S. patent application Ser. No. 11/302,418 also claims the priority benefit of U.S. provisional patent application No. 60/634,951 filed Dec. 10, 2004 and entitled "Real-Time and Predictive Traveler Information for Routing"; U.S. provisional patent application No. 60/658,312 filed Mar. 3, 2005 and entitled "Seven-Day Traffic Forecasts and Trip Advice"; and U.S. provisional patent application No. 60/694,742 filed Jun. 28, 2005 and entitled "Animated Road Traffic Reports." The disclosure of all these commonly owned applications is incorporated herein by reference.

BACKGROUND OF THE INVENTION

1. Field of the Invention

This invention generally relates to systems for monitoring motor vehicle traffic conditions on highways and incidents affecting transit, and to an improved system for alerting drivers of traffic incidents and congestion pertaining to their usual or current route of travel, as well as users of transit of conditions affecting them.

2. Description of the Related Art

Traffic congestion on highways and other roadways has increasingly become a problem, particularly in most large metropolitan areas. For example, traffic congestion is not without an economic impact. For instance, a recent mobility study by the Texas Transportation Institute estimated that the cost of congestion for an average driver in the San Francisco Bay Area during 2002 was about $800 per driver per year, where drivers also wasted an average of 92 hours. This report also estimated that in general more than half of the travel delay is due to incidents such as accidents, obstructions, disabled vehicles, and related problems.

Further, it is largely acknowledged that travelers in the US and other countries are poorly informed of incidents and congestion impacting their route. According to Research Report PRR-2000-07 of University of California in Berkeley, which was commissioned to study an incident reporting system, radio reports are the primary source of Information for travelers. Radio reports are often delayed, as many radio stations report traffic every 10 to 20 minutes. As radio reports are limited to announcing a few incidents and are provided for a large area, their relevance to an individual traveler is generally limited.

For various stages of traffic reporting on the radio, human processing and interpretation of the data is required. As congestion and traffic density increase, and as an increasing number of traffic monitoring systems are being developed, traffic and transit data are becoming richer and more complex. There is also an increased need for speedy dispatch of the data. As such, human processing of the data is becoming ineffective, and automated processing and understanding of traffic data desirable.

TrafficWarn™, dispatches traffic alerts to subscribers. Subscribers are required to choose routes for receiving alerts. Once a route is chosen, alerts are received for the entire length of the route, which can result in the receipt of unwanted and confusing information.

The Sigalert™ system dispatches traffic alerts to subscribers. Subscribers are permitted to select portions of highways.

Although the prior art methods are designed to provide notice to travelers of important information, they generally fail to provide a satisfactory solution to the problem of informing a large population of the travelers as soon as, and every time a problem is known.

Typically, prior art systems for publishing traveler information do not qualify data and therefore routinely publish outdated information. In addition, prior art systems typically publish the exact list of information from a data source without providing necessary additions or correcting omissions. For example, such systems do not predict or publish an expected end time if such data is not explicitly available. In addition, some prior art systems will continue to publish potentially outdated information, if for some reason the supply of fresh data is disrupted. Experience in the development of the invention disclosed herein has shown that disruptions in data can occur frequently. Thus, prior art systems are not enabled to determine whether the impact of an incident has expired.

Therefore, a need exists to provide an improved, more efficient and more automated system for management of incident and congestion data. Preferably, the system should be capable of matching to active or passive subscribers, and providing information through various mechanisms and on various devices including cell-phones and other similar devices which may be ported from one vehicle to another. The system should provide data that is reliable, complete, timely, and preferably concisely stated.

The foregoing and other problems are overcome by methods and apparatus in accordance with embodiments of this invention.

SUMMARY OF THE INVENTION

Disclosed herein are systems and methods for automatically collecting, correcting, merging, and publishing information about traffic, transit, weather, public events and other information useful to travelers. Once available, the information is published with very short system delays. The system provides for the elimination of outdated information on an ongoing basis.

The system further ensures the relevance of the data provided to travelers (users) through enabling the entry and tracking of user specific information that may be customized by location and time.

The system collects data on a continuous basis at one or more locations. One or more feeding programs operate to collect information, parse the information into a standard form, and subsequently transmit the information to a server. The feeding programs are able to transmit data with a very short delay, as they may conduct queries of data sources once every minute or even more frequently. In one exemplary embodiment, the feeding program is run as a daemon program.

A data processor analyzes data provided by the feeding program, determines whether the fed data is new or not, assigns a beginning and end time for each record of fed data, determines whether the data is active, whether the data was previously known or unknown to the system, assigns an importance or severity level to the data. The data processor analyzes fed data continuously, for instance, as a daemon program.

The data processor compiles and stores an up-to-date list of active and new data. In determining whether an incident is known or not known, the system may determine that new information pertaining to known traffic data may increase the severity of the data and classify the data as new and more severe.

In the case where a data supply is disrupted for some reason, which commonly occurs for incident and other traffic data reporting, the data processor will gradually remove outdated events from the active list using known information or reasonable assumptions. For example, the data processor may gradually remove data where previously established event end time predates the current time. Thus, outdated data will be limited by the publishing and dispatching system. In preferred embodiments, the data processor will be fed, or calculate, a latitude and longitude for each record of data.

The system operates to merge data from various sources. For instance, incidents from a state police dispatch system may be merged with highway monitoring speed sensor data produced by a department of transportation. Thus a single data form that is readily and conveniently publishable and dispatchable to subscribers is provided.

The system collects and stores subscriber preferences for each subscriber, or user. Information collected from a subscriber includes, without limitation, unique locations for monitoring (referred to as "segment IDs"), combined with a segment of time (day and time) for monitoring, as well as the severity level of an incident for which a subscriber wishes to be notified.

Users may actively log in to the system and enter preferences. For example, a section of roadway such as Southbound US-101 between Whipple Ave and University Ave may be stored as a single Segment ID. The user also enters certain periods of time when they wish to monitor the given Segment ID. This time may correspond to a known commuting time. The segments may include other transit routes, such as subway or bus.

A publishing and dispatching system takes input from the data processor and publishes active data using text and maps. In case there are new subscribers since the previous execution of the system, the active incident list is matched against new subscribers.

In one further embodiment, users may be passively logged into the database with a device that transmits the user location to the system, such as through use of a GPS receiver, or by a cellular telephone cell, and the system will transmit appropriate route information as is available.

BRIEF DESCRIPTION OF THE DRAWINGS

FIG. 7 is a pictorial illustration of an exemplary routing computation report interface;

DETAILED DESCRIPTION OF THE INVENTION

Disclosed herein are methods and apparatus for providing information relevant to a person traveling a specific route, at a specific time. In the preferred embodiment, this invention provides vehicular traffic congestion information to subscribers, or users, through various communication systems available to consumers. Although disclosed herein as a system for providing vehicular traffic congestion information, the methods and apparatus disclosed may be used to provide any type of information to users where time sensitive general interest information is needed. Examples of such information include, without limitation, weather information, information regarding arrival and/or departure of scheduled flights, trains, as well as other similar types of information.

The disclosure herein describes preferred embodiments in terms of a vehicular traffic monitoring system for the San Francisco Bay area. It should be recognized that the embodiment disclosed is but one embodiment, and the invention herein is not limited to this one embodiment. For example, the teachings herein may be used in other urban and/or rural areas.

The invention herein makes use of various existing technologies. For example, information can be collected by the system from locations on the Internet, such as from a web page that provides real time data. Users may be provided information on communication devices, such as, without limitation, a cell phone, a pager, or through email. One skilled in the art will recognize that the invention disclosed herein is not limited by the communications technologies discussed or related to the teachings herein. As used herein, "real-time data" means data that is available as soon as practicable. Availability of real time data may range anywhere from a few seconds to a few minutes, but typically no more than a few minutes, from the time the data was first known or published.

Tools for the development of software used in this invention may include tools having the capabilities of packages such as: GNUEmacs editor on either a UNIX or Windows platform as well as Microsoft Visual Studio .NET on the Windows platform. The preferred programming languages are C, C++, C#, Perl and SQL, but other language or development tools may be used as well.

A personalized information dissemination system as disclosed herein generally includes components as described in this Overview. However, certain refinements and exceptions to the above relationships and functions exist or may be realized. These refinements and exceptions are either disclosed herein, or may be apparent to one skilled in the art. Therefore, the invention disclosed herein is not to be limited by the exemplary embodiment, or this overview.

Figure 1:
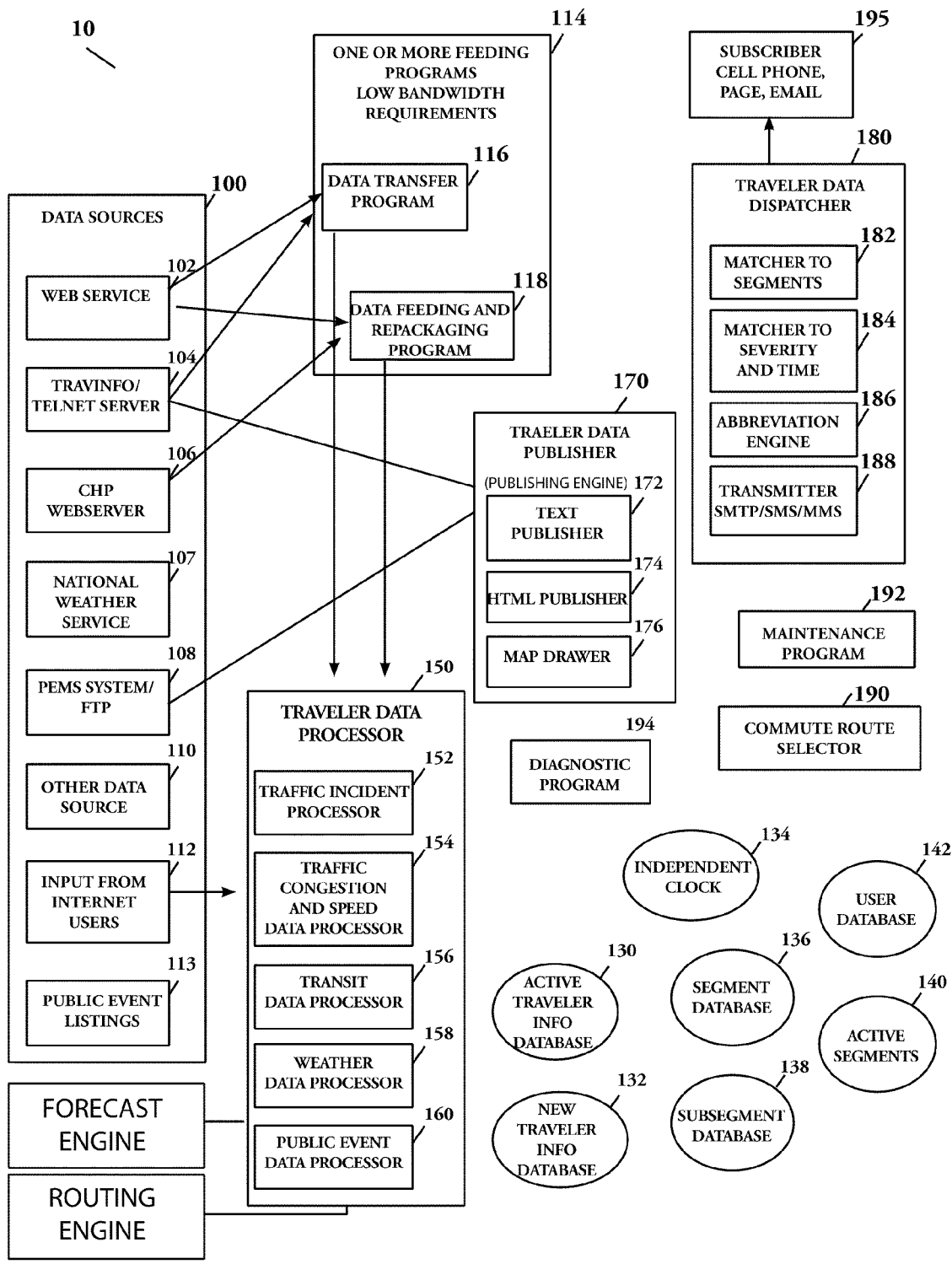
FIG. 1 is a block diagram illustrating the overall system for collecting, publishing and dispatching traveler information.

Referring to FIG. 1, the Traveler Information Dissemination System (TIDS) 10 includes certain components, which generally function as outlined in this overview. Traffic data is provided by sources in real time, or near real time, by third parties. As the data is published, the data is collected by Feeding Programs 114. The Feeding Programs 114 collect the data in various forms from a variety of Data Sources 100. The Feeding Programs 114 standardize the data, and provide the data to the Traveler Data Processor (TDP) 150. The TDP 150 engages in various routines to organize and otherwise manage the data. The Traveler Data Publisher 170 and the Traveler Data Dispatcher 180 complete timely issuance of data to subscribers, also referred to herein as "users." Each user, having entered information desired for a specific or routine itinerary through a Commute Route Selector 190, receives the data through a mechanism such as a cellular phone or pager 195.

In another embodiment, traveler information is generally available for viewing, such as at a computer connected to the Internet. In this embodiment, icons, or graphical icons are used to provide users with general traveler information. In this embodiment, a user may therefore view traveler information that may be related or unrelated to a given route.

Referring to FIG. 1, the Traveler Information Dissemination System (TIDS) 10 includes multiple Data Sources 100, as shown. Data may come from a variety of sources, and in a variety of forms. For example, in the San Francisco Bay area, Data Sources 100 include: the TravInfo™ system 104 (a collaboration of public agencies including the California Highway Patrol, Metropolitan Transportation Commission and CALTRANS). Data may come from a web service 102. Another example of a data source 100 is the California Highway Patrol (CHP) World Wide Web server 106. Other exemplary data sources include the National Weather Service 107, the PeMS system at the University of Berkeley 108, Public Event Listings 113, as well as data input manually by system operators or users using, for example, a User Input Mechanism 112. Other data sources 110 may be incorporated as they become available. The User Input Mechanism 112 may be accessible to selected operators, users, or the general public may be permitted to provide input.

Some of these exemplary Data Sources 100, may require subscription or authentication for access, and may be accessible via Telnet, FTP, or web services protocols. Some of these Data Sources 100 provide comprehensive data, while others do not. Exemplary data is now provided. Other examples of data appear elsewhere in this disclosure.

Example Incident Data (CHP Server)

| No. | Time | Type | Location | Area |
|---|---|---|---|---|
| 0194 | 3:27AM | Disabled Vehicle | SB US101 JNO MARSH RD | Redwood City |
| ADDITIONAL DETAILS | | | | |
| 3:28AM - UNK VEH ON RHS | | | | |
| RESPONDING OFFICERS STATUS | | | | |
| 3:32AM - CHP Unit Assigned | | | | |

Example Congestion Data (CALTRANS)

| Sensor ID | Time Read | Speed | Congestion |
|---|---|---|---|
| 2219 | 03:34:03AM | 47 | 2 |

It should be apparent that the input data inevitably contains differing content. For example, one Data Source 100 may report a location in terms of a street address, another Data Source 100 may report the same incident, having the location in terms of an equipment identification number, such as a sensor, while another Data Source 100 may report location in geographic terms, such as latitude and longitude. Therefore, standardization of data as the data is collected is required to ensure integrity of the TIDS 10.

Referring also to FIG. 1, the Traveler Information Dissemination System (TIDS) 10 includes one or more Feeding Programs 114. The Feeding Programs 114 may be Data Transfer Programs 116, or Data Feeding and Repackaging Programs 118. The Feeding Program Subsystem 114 is responsible for fetching the data from the different Data Sources 100, converting the data to a common format, and pushing the data to a server using periodic FTP connections, which are widely accepted by commercial servers and pose minimal security concerns. Other communication methods may be used.

Various Data Sources 100 provide data, some of which may require modification before use. Modification may involve processing to produce desired information, such as to assign a unique ID to an incident. In cases where little or no data modification is required, a Data Transfer Program 116 is used. In cases where data modification is required, a Data Feeding and Repackaging Program 118 is used. A Data Feeding and Repackaging Program 118 is typically required for public data, such as the California Highway Patrol (CHP) World Wide Web server. In this example, the Data Feeding and Repackaging Program 118 retrieves and analyzes HTML data.

Examples of data that require few manipulations include data produced by a Telnet Server 104, an example being the TravInfo™ system 104. Another example of data that may require few manipulations may be data originating at a specific Web Service 102.

Reliability for the Feeding Program Subsystem 114 is achieved by redundancy. That is, several computers equipped with the same feeding tasks can operate in various locations and on different networks to feed simultaneously.

The Feeding Program Subsystem 114 operation requires minimal bandwidth for transmitting the data. This is due to the limited amount of data involved in each transmission, such as a list of incidents, traffic speed and congestion information at specific locations.

The Feeding Program Subsystem 114 may thus successfully operate from a small collection of PCs connected with a low-grade connection to the Internet, such as cable or DSL.

A Unique identification is produced for each incident, so that several independent instances of Feeding Programs 114 may be executed in parallel. The Feeding Programs 114 may be executed on one or more computers, at one or more locations. The creation of the Unique ID in association with each record of data provides for subsequent sorting and elimination of redundant data. The Unique ID may be created using any convention that is suitable to the TIDS 10 operator, (such as by combining date, time and location information), or the Unique ID may be produced by one or more of the Data Sources 100.

Referring also to FIG. 1, a Traveler Data Processor 150 and a Traveler Data Publisher 170 typically execute on a server computer that has access to large bandwidth on the Internet, and are directed to publishing data very quickly and for a large number of users. Such servers may be potentially shared by several companies, and may impose certain communications restrictions, for reasons such as efficiency and security. Accordingly, in preferred embodiments, the Feeding Programs 114 push data to the Traveler Data Processor 150. However, in some embodiments, the Traveler Data Processor 150 and/or Traveler Data Publisher 170 may obtain data directly. For example, data may be obtained directly when using the FTP protocol, or when receiving input from users via a User Input Mechanism 112.

As disclosed herein, it is generally preferred that the Feeding Programs 114 "push" data to the Traveler Data Processor 150. That is, the Feeding Programs 114 send data files to the processing system. The appropriate data processor subsequently opens the data files for processing. In other embodiments, tasks related to the communication of data between the data processors, such as, in non-limiting examples, some of the other embodiments described in the previous paragraph.

The Traveler Data Processor 150 coordinates with external resources as appropriate to ensure accurate or reliable operation. For example, the TIDS 10 maintains an accurate Clock 134 by reference to an external clock, such as one maintained by the National Institute of Standards Technologies. Maintaining an Independent Clock 134 limits inaccuracies in calculation of end times that may arise from reliance upon server clock time.

The Traveler Data Processor 150 includes at least one and preferably more of the following sub-processors: a Traffic Incident Processor 152; a Traffic Congestion and Speed Processor 154; a Transit Processor 156; a Weather Processor 158; and, a Public Event Processor 160. In other embodiments, additional or other sub-processors may be included. These additional or other sub-processors may be used to process data from sources not disclosed herein.

The Traveler Data Processor 150 executes on a regular basis using either an on-going daemon program that switches periodically between a waiting and an active state, or a program that stops completely and is started or executed periodically. An example of the latter is the cron mechanism on UNIX operating systems.

It is preferred to have a Traveler Data Processor 150 execute frequently, such as every minute, or more frequently. However, in some embodiments, it is appropriate to vary the interval of execution. For example, in the embodiment where weather information is of principal interest, it may be necessary to execute the Traveler Data Processor 150 only once per hour. Execution frequency of the Traveler Data Processor 150 therefore depends on various factors, such as the nature of the data predominating in the TIDS 10.

Although the Traffic Incident Processor 152 will now be discussed in detail, it should be realized that aspects of the Traffic Incident Processor 152 may appropriately function or coincide with other sub-processors, such as those disclosed herein, or as may be used in accordance with the teachings herein. Each of the sub-processors ensure data quality through functions including, and not limited to, completing missing information in records of input data provided by the Feeding Programs 114, or directly by one of the Data Sources 100. The sub-processors therefore share and complete analogous tasks for each of their respective streams of data.

That is, some of the current data provided by a Data Source 100 may not be provided with information that is important to a traveler. Accordingly, each sub-processor will analyze each record of the particular data, or stream of data, calculate or estimate appropriate values as may be missing or otherwise valuable to a traveler, and include these values in the current or input data.

As used herein, the process of including omitted or otherwise valuable information in the current or input data is also referred to as "completing", "ensuring", or "producing" quality data. The result is that current data, or streams of data, are transformed into quality data. It should be noted, however, that quality data may be referred to by other terms, such as, "traveler information" or in other similar terms, and that such data is therefore not limited by the terminology.

Non-limiting examples of ensuring data quality include: adding geographic coordinates; including a severity level; assigning a unique identifier, and others. Another non-limiting example of ensuring data quality involves projecting an incident end time for the current data.

The Traffic Incident Processor 152 accepts input from a variety of sources, either through the Feeding Programs 114, such as the Transfer Programs 116, the Data Feeding and Repackaging Programs 118, and/or directly from the Data Sources 100. Among other things, the Traffic Incident Processor 152 determines if the incidents input are currently active. For example, the Traffic Incident Processor 152 determines if an incident has a current impact on travelers depending upon the incident description, location, and estimated beginning and end time. As another example, the Traffic Incident Processor 152 evaluates a temporal aspect of the incident. In this case, the Traffic Incident Processor 152 compares the time between the beginning and end time (if presented in the data) to the present time. If the end time is not in the past, the temporal comparison shows the incident has a current impact. If the incident has a current impact, the incident is put into the Active Traveler Information Database 130.

Subsequently, incident data may be repackaged in the form below, or in a similar form. In preferred embodiments, the incident data record includes a unique ID as a 6-digit number, or other unique form.

Example Repackaged Incident Data

| Traffic Incident: | #130194 | | |
|---|---|---|---|
| Type: | Obstruction | | |
| Subtype: | Disabled Vehicle | | |
| Started: | FRI 02/21/03 03:27:00AM | Updated: | FRI 02/21/03 03:28:00AM |
| Expected End: | FRI 02/21/03 03:47:00AM | | |
| Reported By: | CHP | Time: | FRI 02/21/03 03:28:00AM |
| Location: On: | US-101 S | At: | MARSH RD |
| City: | Redwood City | County: | SAN MATEO |
| Description: | .CHP 0194, 3:28AM - unk veh on rhs 3:32AM - CHP unit assigned | | |

In the foregoing example, the expected end of the incident is computed by the system, by adding a fixed amount of time to the incident start time or end time. The fixed amount of time added may vary, depending upon factors such as the type and severity of the incident, and the number of updates an incident has received.

After the Traffic Incident Processor 152 finishes one run of execution, global positioning coordinate and severity level information is preferably generated. Generation of this information for each incident provides at least for placement on a map, and ranking with respect to severity:

Example Generated Global Positioning Coordinate and Severity Level

| | | |
|---|---|---|
| Coordinates: Lat: 372834N | Lon: 1221004W | |
| Severity: 11 | | |

The following Table 1 lists exemplary severity levels that may be associated with incidents when examining the type, subtype, and description of incidents, wherein the lowest severity number corresponds to the most severe incidents types.

TABLE 1

| Keyword(s) | Severity Level |
|---|---|
| SIGALERT/Avoid the Area | 5 |
| Injury Accident/Ambulance Responding | 7 |
| Accident/Traffic Collision | 8 |
| Fire | 9 |
| Obstruction | 10 |
| Disabled Vehicle/Bus or Truck | 11 |
| Fog | 12 |
| Snow | 13 |
| Wind | 14 |
| Closure | 15 |
| General Warning | 16 |
| Planned Event | 17 |
| Pedestrian or animal on roadway | 26 |

Other factors, such as the incident duration may yield a lower severity number, as well as the indication that the same incident was reported and corroborated by another independent data source (such as CHP 106 and TravInfo™ 104, or CHP 106 and a Web user 112). Typically every time the system receives an update for the same incident, indicating that the same incident procedures, the severity number is decreased by one for that incident. This rule may not be applied for certain types of incident, such as road work or weather-related incidents (heavy winds, snow). Severity level is therefore a preferred embodiment of indicating an impact upon a traveler. The impact is assessed by severity, or the magnitude of the disturbance typically associated with such an event.

The New Traveler Information Database 132 is used as a data resource for pushing new traveler information to users, and will be described in greater detail in reference to the Traveler Data Dispatcher 180. The Active Traveler Information Database 130 contains information of incidents and other traveler data that is currently in effect and presumably impacts travelers.

An impact determination depends, at least in part, upon time indicated by the Independent Clock 134. That is, the end time of an incident should not be significantly prior to the indicated time on the Clock 134. Other factors may play a role in the determination of whether traveler information is active. For example, an incident may be reported for a location that is outside the geographical coverage of the system.

The Traffic Incident Processor 152 ensures that the information in the Active Traveler Information Database 130 is up-to-date; this means that the contents of the Active Traveler Information Database 130 contain quality data for publication by the Traveler Data Publisher 170.

The Traveler Data Dispatcher 180 ensures that the New Traveler Information Database 132 is up-to-date, meaning that the contents of the New Traveler Information Database 132 contain quality data for dispatch to subscribers. After the Traffic Incident Processor 152 finishes processing an incident and incorporates associated information into the Active Traveler Information Database 130 the complete information regarding the incident would typically be as follows:

| | | | |
|---|---|---|---|
| Traffic Incident: | #130194 | | |
| Type: | Obstruction | | |
| Subtype: | Disabled Vehicle | | |
| Started: | FRI 02/21/03 03:27:00AM | Updated: | FRI 02/21/03 03:28:00AM |
| Expected End: | FRI 02/21/03 03:47:00AM | | |
| Reported By: | CHP | Time: | FRI 02/21/03 03:28:00AM |
| Location: | On: US-101 S | At: | MARSH RD |
| City: | Redwood City | County: | SAN MATEO |
| Coordinates: | Lat: 372834N Lon: 1221004W | | |
| Advice: | Drive carefully | | |
| Status: | unknown vehicle on right-hand-side | | |
| Description: | .CHP 0194, 3:28AM- unk veh on rhs 3:22 AM - CHP unit assigned | | |
| Severity: | 11 | | |

The Traffic Incident Processor 152 combines incident information with the Independent Clock 134 and other domain knowledge information to manage, add to, enhance and correct the information. Below is an example of data correction, wherein the data source inputs erroneous information for the location of an incident: a latitude of 0 and a longitude of 0.

| | | | |
|---|---|---|---|
| Traffic Incident: | #26402 | | |
| Type: | Planned Event | | |
| Subtype: | Skating | | |
| Started: | SAT 02/22/03 07:16:30PM | Updated: | SAT 02/22/03 09:44:51PM |
| Exacted End: | SAT 02/22/03 10:14:51PM | | |
| Reported: | By: CHP | Time: | SAT 02/22/03 10:14:51PM |
| Location: | On: COW PALACE | At: | |
| City: | (unknown) | County: | SAN MATEO |
| Coordinates: | Lat: 0000000N Lon: | 0000000E | |
| Status: | All Lanes Open | | |
| Advice: | drive carefully | | |
| Description: TIC : Special event - Skating: Disney On Ice at the Cow Palace show starts at 7:30 pm and ends at 10 pm. Expect delays | | | |

In preferred embodiments, the Traffic Incident Processor 152 detects that the latitude and longitude are erroneous and determines the proper latitude and longitude for the incident location:

| | | | |
|---|---|---|---|
| Traffic Incident: | #126402 | | |
| Type: | Planned Event | | |
| Subtype: | Skating | | |
| Started: | SAT 02/22/03 07:16:30PM | Updated: | SAT 02/22/03 09:44:51PM |

-continued

| | | | |
|---|---|---|---|
| Expected End: | SAT 02/22/03 10:14:51PM | | |
| Reported: | By: CHP | Time: | SAT 02/22/03 |
| Location: | On: COW PALACE | At: | 10:14:51PM |
| City: | (unknown) | County: | SAN MATEO |
| Advice: | drive carefully | | |
| Coordinates: | Lat: 374227N Lon: 1222510W | | |
| Status: | all lanes open | | |
| Description: | .TIC Special event Skating: Disney On Ice at the Cow Palace show starts at 7:30 pm and ends at 10 pm. Expect delays | | |

The Traffic Congestion and Speed Processor 154 typically operates similarly to the Traffic Incident Processor 152. Due to the nature of congestion and speed data, the Traffic Congestion and Speed Processor 154 may execute less frequently, that the Traffic Incident Processor 152. As congestion and/or speed data is considered somewhat erratic, or inconsistent, in preferred embodiments, the Traffic Congestion and Speed Processor 154 averages incoming data and applies filters to smooth the data and provide reliable information. A convenient filter for this purpose is a median filter, wherein $s_t$, the speed at time t is obtained using the formula: $s_t=\text{median}(s_i)$ wherein $s_i$ are the speed values at times before and after t. In some embodiments, the use of data averaging or smoothing causes a slight delay. Accordingly, other smoothing algorithms or techniques may be employed to optimize the availability or other aspects of the data.

The Weather Processor 158 examines weather data. If the data is new and different from the weather data already stored in the Active Traveler Information Database 130, then the Weather Processor 158 places the new data in the Active Traveler Information Database 130 for the Traveler Data Publisher 170 to use. The Weather Processor 158 then scans input data for relevant keywords, such as the names of counties. The Weather Processor 158 may then create hyperlinks for those such that when a Web user on the Internet selects such a hyperlink the Web user is immediately presented with the weather data for that county. Such hyperlinks are preferably stored in an html file suitable for publication.

The Transit Processor 156 and Public Events Processor 160 also operate in a manner similar to the Traffic Incident Processor 152 and the Traffic Congestion and Speed processor 154. For example, the Transit Processor 156 and Public Events Processor 160 also adapt the frequency of execution to aspects of the incoming data. Typically, the most frequent execution is needed for the Traffic Incident Processor 152, because data relating to events, such as accidents or other traffic disruptions, typically have a short lifespan and must be disseminated as quickly as possible to be valuable or relevant to a user. In addition, it has been found that weather data, public event data, and other similar types of data are generally provided by at least one data source 100, and therefore may, in some instances, appear in other data streams. For example, notice of a public event may be included in data from a traffic incident data source, and thus treated by the Traffic Incident Processor 152 as if the public event were an accident or other traffic disruption.

The Traveler Data Publisher 170 is mainly responsible for publishing the quality data on the Internet, thereby making the data accessible to the general public, including potentially users of cell-phones who can access websites using the WAP protocol. The TIDS 10 also include a Traveler Data Dispatcher 180, which sends or pushes quality data to a user.

The main difference between the Traveler Data Publisher 170 and the Traveler Data Dispatcher 180 is that the Traveler Data Dispatcher 180 typically pushes new data to subscribers as soon as the information is known by the system, whereas the Traveler Data Publisher 170 publishes the data for users to actively retrieve it. Retrieval may be accomplished, for instance, with a web browser. The Traveler Data Publisher 170 typically uses the Active Traveler Information Database 130 and publishes its content, while the Traveler Data Dispatcher 180 uses the New Traveler Information Database 132, so that only new information is being pushed to a subscriber. The New Traveler Information Database 132 is then flushed upon each execution of the Traveler Data Dispatcher 180.

The Traveler Data Publisher 170 typically comprises a Text Publisher 172, an HTML Publisher 174, and a Map Drawer 176.

The Text Publisher 172 typically publishes incident data in complete text form, which may be most appropriate for some individuals, such as transportation or media professionals interested in obtaining all the available detail. The Text Publisher 172 preferably sorts the incidents in decreasing rank of the severity number. The Text Publisher 172 preferably groups incidents by counties.

The HTML Publisher 174 preferably sorts incidents in decreasing rank of the severity number and groups incidents by counties similarly to the Text Publisher 172. The HTML Publisher 174 also displays a different icon for each incident type or subtype. The HTML Publisher 174 preferably tests for the presence of keywords to determine which icon preferably represents an incident. If no keyword is found, an icon may be used instead.

A portion of html and javascript code may be used to implement a routine wherein when pointing to an icon, detailed information about the underlying incident or event is displayed on the user's computer screen. An input mechanism may include, without limitation, a mouse or a stylus.

Although disclosed herein as an HTML Publisher 174, it is recognized that some equivalent embodiments may not employ HTML. Therefore, the HTML Publisher 174 may also be referred to as a "graphical icon publisher." Other aspects of publication are disclosed below.

The Map Drawer 176 displays a map with incident, speed and congestion data, wherein at least one of the size and the color of overlying icons used to provide notice of traveler information is varied with an aspect of the associated traveler information. For example, in one embodiment, larger overlying icons are presented for indicating more severe incidents. In other embodiments, a more intense and saturated color is used for more severe incidents.

In another embodiment, graphical icons are drawn on the map. In this embodiment, the graphical icons may convey information themselves. For example, a graphical icon may include a symbol for a tow truck, an event, a fire truck, or another symbol that is readily understood by the user. A key to graphical icon symbology may be included or otherwise available the user. An example of graphical icons, with an accompanying key, is provided in FIG. 4.

Preferably, the icons appear in inverse order of severity: most severe (and larger) first followed the least severe (smaller). In this way, if overlap occurs, the smaller icons only partially obscure the larger ones and both are visible. Other embodiments of these teachings may be used.

Similarly with the HTML Publisher 174, when the user's mouse goes over an incident icon, detailed information about the incident is displayed on the user's computer screen. In case of overlap, the most severe information is displayed. This is achieved by listing the most severe information first in the list of pop-ups.

The Traveler Data Dispatcher 180 dispatches new information to subscriber devices, such as, in non-limiting examples, cell phones, pagers or email 195. The Traveler Data Dispatcher 180 typically comprises a Matcher to Segments 182, a Matcher to Severity and Time 184, an Abbreviation Engine 186 and a Transmitter SMTP/SMS/MMS 188.

An incident may be dispatched as appropriate to a given subscriber by the Matcher to Severity and Time 184 respecting the subscriber and general requirements in terms of the incident severity.

In preferred embodiments, the Commute Route Selector 190 is accessible from the Internet. Users can choose to watch specific routes at certain times and on certain days. The user selecting a route is preferably presented with a selection of roadway or highway options with corresponding visual icons representing highway signs.

For purposes of illustration of route selection, a limited sample of roadways for the San Francisco Bay Area is presented:

| US-101 N | I-80 N | I-880 N | CA-85 N | CENTRAL_EXPY |
|---|---|---|---|---|
| US-101 S | I-80 S | I-880 S | CA-85 S | OTHER |

In preferred embodiments, typically about 50 highways (hence 100directions) are presented to the user on one page next to representative icons. The user is expected to choose one. If the user wishes to watch another highway, then the user may select the "OTHER" highway.

The user is then requested to choose a specific roadway, a time span for watching the specific roadway, and a level of information severity for which they wish to subscribe. As an example, a user may select criteria that equate to the following:
TUE
BETWEEN 2:00 PM
AND 6:00 PM
DOES NOT INCLUDE GENERAL WARNINGS, SLOWDOWNS AND ROAD WORK In preferred embodiments, the foregoing selection is made using a combination of checkboxes, selection boxes and text forms. If the "OTHER" highway was selected before, then the user is requested to type in the name of a roadway in a text box.

Finally, the user is requested to choose segments along the route of his choosing, by either selecting segments individually or selected a beginning and end segment and requesting that all segments in between be selected. Segments are typically represented to the user as follows:
On US-101 N From UNIVERSITY AVE To WILLOW RD In SANTA CLARA county
On US-101 N From WILLOW RD To MARSH RD In SAN MATEO county
On US-101 N From MARSH RD To WOODSIDE RD In SAN MATEO county
On US-101 N From WOODSIDE RD To WHIPPLE AVE In SAN MATEO county
On US-101 N From WHIPPLE AVE To REDWOOD SHORES PKY In SAN MATEO county It is noted that internally to the TIDS 10, each segment contains a unique location or identification code. The segment information may also include latitude and longitude values. The unique location code and geographic coordinates are preferably not revealed to the user.

The unique location code, or segment ID as referred to herein, is generally used for sorting and accessing data internally. That is, location information is typically stored according to a segment ID, as well as the user criteria for desired notifications. Unique location codes may also be referred to as "user criteria location codes" as these codes are preferably used for sorting and/or other functions related to management of the traveler information.

The unique location codes, or segment IDs, are known for each segment of road, or may be assigned for locations newly introduced to the system 10. Information corresponding to a unique location code (i.e. newly introduced location) may be entered manually, or derived by the system 10. Derivation may include referencing to a map database, or other database. For newly introduced locations, such as subsegments, the system 10 preferably assigns new unique IDs automatically using conventional methods for assigning new unique IDs. In another embodiment, unique IDs are added manually by a system administrator.

Once a first segment selection is completed, the user is then offered to choose another route and follow the same steps to add more segments. The Commute Route Selector 190 stores the information provided by the user in a User Database 142. Among other things, the Commute Route Selector 190 maintains a list of Active Segments 140 that are actively watched by users.

If a user stops watching or changes the segment that he or she is watching, then the Commute Route Selector 190 modifies the Active Segment 140 accordingly. This maintenance is preferably accomplished by a Maintenance Program 192 that executes periodically when the system is least used, such as once a day during the night. In some embodiments, the Maintenance Program 192 may also monitor the number of alerts being sent, as well as user subscription information, and may send email to subscribers requesting feedback, or notification that a free trial period will end soon, etc.

Active Segment 140 are preferably stored by referencing the ID of the segment and the window of time the segment is being watched by a subscriber. In a first embodiment, each segment ID with at least one subscriber watching is stored as a file on disk that can be quickly retrieved by the operating and file system of the computer once equipped with only a file name.

Hash-tables may be also be used in an alternate embodiment instead of files. Hash-tables reside in main memory instead of on the hard disk. A database system such as Oracle or Microsoft SQL Server or Microsoft MSDE may be used as well.

For example, a segment ID may be 9000 for a given segment, or 1 for a public place, where public events affecting travelers may occur. In practice, one operational system includes about 10,000 segments correlated to San Francisco Bay Area highways and about 20 public places, such as 3COM Stadium, PACBELL Park, and the SHORELINE Amphitheater.

An example of the system for correlating a highway segment ID with users watching the segment is now provided. First, in preferred embodiments, the Segment Database 136 contains a record that describes the segment. An example of a segment record maintained in the Segment Database 136 is provided:
9000, 37.416306,−122.085846,US-101 N,N SHORELINE BLVD, N RENGSTORFF AVE,SANTA CLARA In this example, the first number is the segment identification number, the second and third numbers represent latitude and longitude. In this embodiment, a corresponding data file is used to store user information. An example of the information that may be stored in file named "9000" is as follows:
MON, TUE, WED, THU, FRI Between: 5 30 PM And: 8 00 PM Sendto:user1@xxx.com
User:user1 Sev:25

MON, TUE, WED Between: 7 30 AM And: 8 45 AM
Sendto:18005550000@mobile.wirelessprovidername.net
    User:user2 Sev:25
MON, TUE, WED, THU, FRI Between: 6 30 PM And: 8 30
    PM Sendto:user3@yyy.zzz
User:user3 Sev:25

In this embodiment, as such as soon as traveler information is located on a segment, and the segment ID is known, the TIDS 10 correlates the location of the traveler information with the segment ID, and obtains user criteria from the data file named 9000. The system 10 will then process notifications appropriately.

In another embodiment, the times and days may be reduced to numerical codes. For instance each possible quarter of hour of a week may be encoded using a four-digit code using between 1 and 7 for encoding the day, 00 through 23 for encoding the hour, and 0 through 3 for encoding quarters of hours. Each possible hour may be encoded with a three-digit code. Such codes may be combined with the segment ID to form a combined ID. Matching combined IDs for traveler information and subscribers would guarantee that not only the segment is being watched by the subscriber but also at a time that matters to the subscriber.

In practice there is a trade-off between the speed and efficiency that is required to match information to subscribers and the complexity and size of the encoding. The current system preferably uses the embodiment wherein the matching occurs on the segment ID first and a test is applied to determine whether an alert should be sent to the subscriber or not.

In another embodiment of the Commute Route Selector 190 maintaining a list of Active Segment 140, a user may communicate to an operator a verbal or written description of his or her commute route and commute times and the operator may enter the times and route as a list of segment IDs using the previously described method. The user may also communicate an origin address and time, and a destination and time, or an origin zip-code and time, and a destination zip-code and time, and conventional methods may be used to compute one or several routes between origin and destination.

In another embodiment of the Commute Route Selector 190 maintaining a list of Active Segment 140, a device or process may communicate a user's location, speed and/or heading back to the TIDS 10 through use of a wireless device, such as a transmitter or a transceiver. An example of a wireless device includes a Global Positioning System (GPS) receiver coupled with a cell phone.

There are means known in the art, other than GPS, to obtain position information. Notably, for a cellular telephone user, the cellular carrier may use "time difference of arrival (TDOA)" from cellular base stations for specifying the location of the cellular telephone.

The information provided by a GPS device supporting the NMEA standard would preferably be presented as indicated in the line below, wherein the second value is the time in hours, minutes and seconds in UTC or GMT time, the fourth and fifth values represent latitude, the sixth and seventh longitude, the eight speed in kilometers per hour, the ninth value represents the heading in degrees of an angle:

$GPRMC, 221218, A, 3720.8323, N, 12203.6006, W, 90.40,
    179.6, 150203, 15.4, E*51

In preferred embodiments, such information is typically updated every second. The latitude and longitude are first converted to decimal values using methods known in the art, and are then compared with the segment latitude and longitude values of the Segment Database 136. A segment is typically associated with one latitude and one longitude value that is typically representative of the center of the segment. A conventional method for determining which segment the subscriber is on would compare the latitude and longitude of each segment with the current latitude and longitude, compute a Euclidean distance in decimal latitude and longitude space, and select the closest segment according to the distance. The problems with this conventional method is that the direction of travel is not taken into account, as well as the interference between segments on unrelated routes that are close in latitude and longitude. An exemplary result of applying this conventional method as is follows: after one second elapses the system wrongfully determines that the subscriber has changed direction:
37.3450633333333,   −122.060001666667,   99.970000,
    CA-85 N, W HOMESTEAD RD, W FREMONT AVE
37.3448166666667,   −122.059996666667,   98.500000,
    CA-85 S, FREMONT AVE, HOMESTEAD RD The correct answer, obtained using the following embodiment of the present invention, is as follows: the subscriber has moved to an adjacent highway segment in the subscriber's direction of travel.
10000,37.3450633333333,−122.060001666667,99.970000,
    12404,CA-85 S,E EL CAMINO REAL,FREMONT AVE,
    1.9691579361947e-005,0.99604531303652
10001,37.3448166666667,−122.059996666667,98.500000,
    12405,CA-85   S,FREMONT   AVE,HOMESTEAD
    RD,4.72667650033294e-006,0.985999240195501

The collection of highway segments forms a directed graph.

The TIDS 10 determines for each segment relationships with other nearby segments. For instance, segment 10000 immediately precedes segment 10001 along highway CA-85 Southbound, as Segment 10000 ends at FREMONT AVE and Segment 10001 starts at FREMONT AVE.

Using incident segment information, the TIDS 10 determines a vector in (latitude, longitude) coordinates for the segment, compute the distance to this vector using methods known in the art for the distance between a point and a vector and also compute a scalar product between the direction of travel and the segment direction.

The best segment match is obtained with a combination of a low distance and high scalar product, with a preference for the same segment on which the subscriber already is or the following segment along the same highway as it is noted at 60 miles per hour, the vehicle stays on the same segment for about 60 measurements of the GPS device. The current formula is preferably used to determine the best match: Minimize A*distance−B*scalar_product+C*ID_flag wherein A, B, and C are constants that may be tuned, and ID_flag equals zero if the segment is the same and one if the segment is different for the current segment. For the first match as there is no current segment all ID_flags are equal to zero. B may be set to zero, in which case segments corresponding to negative scalar products must be eliminated.

A wireless device may communicate with the server hosting Active Segment 140 via WAP, HTTP, SMS, etc. A subscriber may thus subscribe to traveler information completely automatically, without action from his or her part. The subscription uses a combination of wireless communication and geographic positioning, informing a server of the segment on which the subscriber is, the segments on which the subscriber is likely to be on in the near future, and communicating this information to the Commute Route Selector 190 for insertion in the list of Active Segment 140.

Such data automatically transmitted to the Commute Route Selector 190 may be used for recording a usual commute route.

The percentage of traveling spent commuting is significant in the US, thus the Commute Route Selector 190 provided by the present invention is particularly beneficial to travelers that repetitively commute a known route. The facility provided by the Commute Route Selector 190 therefore simplifies the process of gathering and/or retaining the commute route information.

In case the user's commuting profile is already known to the system, automated transmission of the user's current segment may locate the user along his or her commute route and provides for temporarily discarding the segments already traveled by the user for the purpose of sending alerts.

If the current route is not usual or if there is no particular need or want to record the route, the information transmitted to the Commute Route Selector 190 may still be used to dispatch current incidents in neighboring or upcoming segments. Such information may also be used to subscribe temporarily to alerts on upcoming segments, based upon speed and time data. A combination of publishing of current incidents (relevant for the Traveler Data Publisher 170) and temporary subscription to dispatches (relevant for the Traveler Data Dispatcher 180) may be suitable so as to limit the number of back-and-forth communications between the user's wireless device and Commute Route Selector 190 and server or computer on which the Commute Route Selector 190 runs.

Finally, the information collected may be used to compute travel time and speed, as it is widely regarded that GPS data systems provide accurate time and speed estimates. The travel time and speed, which are a form of traveler information, and may be optionally published by the Traveler Data Publisher 170 and dispatched by the Traveler Data Dispatcher 180 if there is an agreement with the source of the data that such further publishing and dispatching are acceptable.

The level of severity of the information dispatched to the user may be changed at any time by the subscriber or the administrator of the system 10. The system 10 may monitor the number of alerts that were sent to a user, and beyond a certain number send an email to the user, explaining that various levels of severity are possible. The email recipient may then click on either link to adapt the level of severity of the information to his or her choosing. An exemplary email is shown below, explaining the current levels of severity supported by the system 10. Since an underlying system of numerical severity values is used, any number of thresholds may be put in place corresponding to fewer severity values exposed to subscribers, such as a three-level system shown below. But an n-level system where n is an arbitrary integer value is also possible. An exemplary e-mail message follows:

Dear subscriber

You can customize the level of alerts SF Bay Traffic Information dispatches to you. We currently offer three levels of alerts:

1—Incidents that cause the closure of one or several lanes, such as CHP Sigalerts, serious accidents, fires.

Please follow the link below to turn on these types of alerts only.

<link address provided here.>

2—All other incidents except warnings, heavy traffic alerts, etc.

Please follow this link:

<link address provided here.>

3—All incidents including warnings. These may be numerous depending upon the roads you are watching.

Please follow this link:

<link address provided here.>

You may change your options at any time using any of the links above.

It is expected that the Data Sources 100 are, or will be, available in different locations, on different networks, and on different computers. However, it is conceivable to have several data sources on the same computer.

In preferred embodiments, the Data Sources 100 may communicate with the feeding programs 114 and the Traveler Data Processor 150 through the Internet, however, it is recognized that a large variety of communication requirements or protocols may exist and need to be overcome. However, the techniques required for communicating data from the Data Sources 100 are not discussed further herein.

In preferred embodiments, the Traveler Data Processor 150, Traveler Data Publisher 170, Traveler Data Dispatcher 180, Commute Route Selector 190 and Maintenance Program 192 execute on the same computer, such as a server. In preferred embodiments, the Active Traveler Information Database 130, New Traveler Information Database 132, Independent Clock 134, Segment Database 136, sub-segment Database 138, User Database 142 and Active Segment 140 are also located on the server. However, provided these different components have functional access to all databases and other components they need to operate, they may be located and executed on different computers. An example of a system configuration that is supportive of this implementation includes, without limitation, a network system.

Reliability is considered to be a critical factor for a successful traffic reporting system, as well as cost effective operation. Therefore, the invention disclosed herein was designed to achieve a high level of reliability without incurring prohibitive costs. The above described design choices have allowed at least one operational example of the invention disclosed herein to achieve significant reliability at a low cost.

The system 10 disclosed herein decouples the operations of feeding and preprocessing the data (subsystems 114 and 150) publishing the data on the Internet (subsystem 170) and delivering the data to subscribers using messages (subsystem 180).

The Web/Internet hosting industry has made available computers with significant computational power, a large bandwidth to the Internet, and software, i.e. "web servers, or application servers" specifically designed to serve customers files or the result of executing programs through the Internet and Web browsers such as Netscape and Microsoft's Internet Explorer. Non-limiting examples of web server or application servers are: Apache Software Foundation's "Apache" Microsoft Corporation's "IIS", and BEA Systems's "WebLogic".

Because of the requirement to serve web pages on a continuous basis schedule, the combination of hardware and software involved should be very reliable, rarely unreachable or out of service.

Accordingly, the Traveler Data Processor 150 and Traveler Data Publisher 170 use programs that may execute periodically on a server, merging the data from different sources, and preparing the data for publishing. These programs, however, typically do not fetch the data through the Internet but rather look periodically if new data was deposited/made available on the server.

Figure 2:
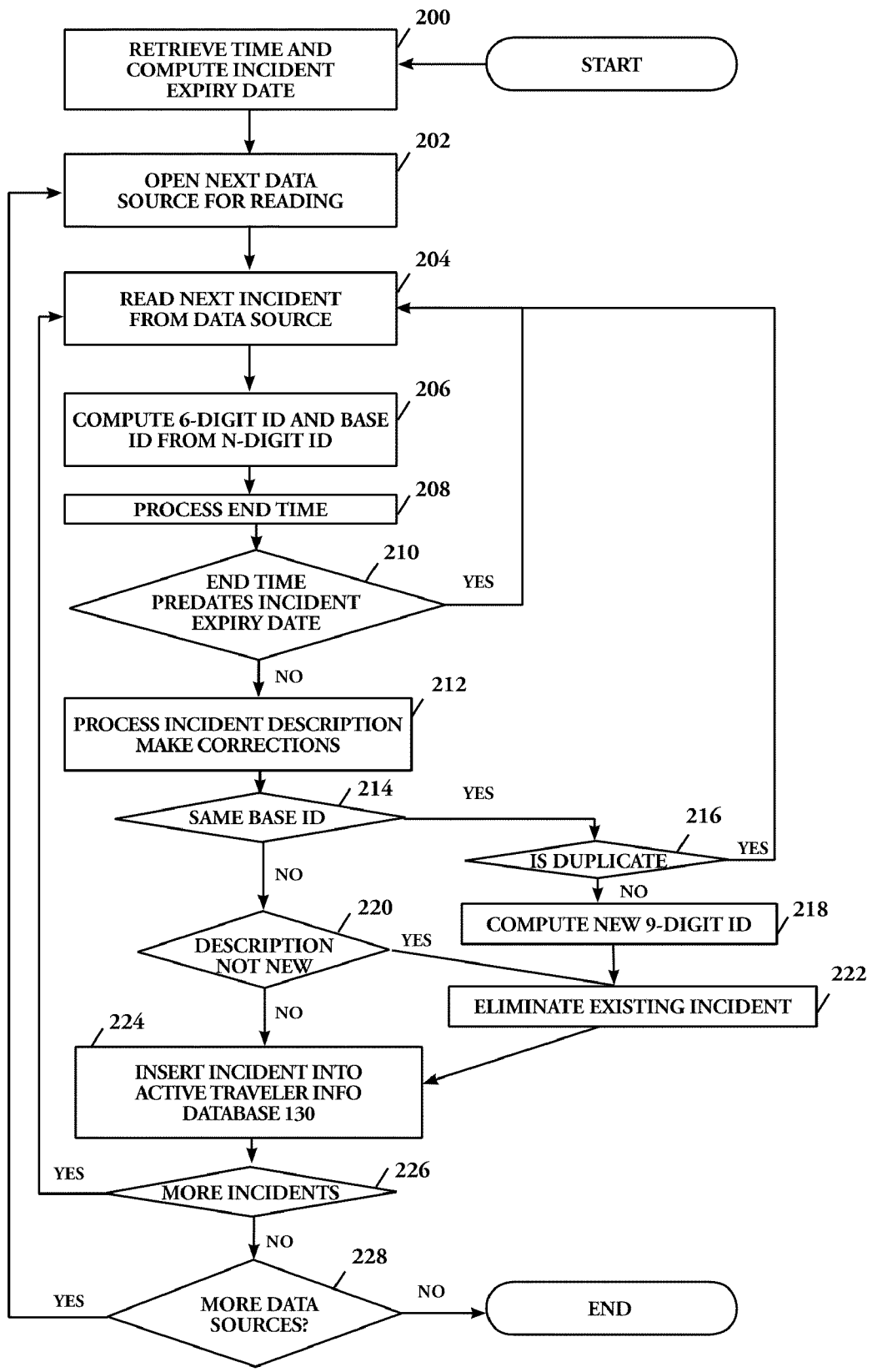
FIG. 2 is a flow chart illustrating the details of the processing of traveler information.

The operation of the Traffic Incident Processor 152 is more clearly explained with reference to FIG. 2. Preferably, Traffic Incident Processor 152 reviews all the traffic incidents in the Active Traveler Information Database 130 and rewrites it from scratch every time it is executed. Other sub-processors may similarly process corresponding input data.

In Step 200, the Traffic Incident Processor 152 obtains the current time from the Independent Clock 134 and determines an incident expiration threshold. In one embodiment, the Traffic Incident Processor 152 completes this step by subtracting a few minutes from the current time. As an example, the Traffic Incident Processor 152 subtracts about ten minutes. This embodiment subsequently provides for the publication of incidents a few minutes after their expected end time, thus accounting for some of the potential errors in the expected end time.

Then, available Data Sources 100 for traffic incidents are processed in turn. The first Data Source 100 is the Active Traveler Information Database 130 which contains the list of incidents currently known and currently active. The subsequent Data Sources 100 may be processed in any order, for instance in the ordering implied in FIG. 1 inside the Data Sources 100 block.

In Step 202 the next Data Source 100 is opened for reading. The data from the Data Source 100 is preferably located on the same computer where the Traffic Incident Processor 152 operates, as pushed using the Feeding Programs 114; if this is not the case there are various techniques for retrieving the data from a remote location, using either the Telnet or FTP network transfer protocols. Remote access is not preferred as this may incur a delay and a potential risk that the data or network connection may be unavailable.

In Step 204, an incident is retrieved from a Data Source 100. In Step 206, the system 10 reads the incident ID of the incident. Preferably the system 10 uses 6-digit incident IDs for an incident that is encountered by the system 10 for the first time, for instance 123456. If the system 10 receives updates on that incident then a 9-digit system is used instead as follows: the first update will have the ID 123456000, the second update 123456001, the third update 123456002 and so on.

The system 10 may thus determine if the incident newly introduced, or is an update to existing information. This determination is completed by testing the ID. In preferred embodiments, the test ascertains if the ID is larger or equal to one million. In case the ID is larger or equal to one million, then the system 10 computes a base ID as follows: Base ID=ID/ 1000.

In Step 208 the system 10 processes the end time of the incident. In case the end time is not available, a default duration is being added to the start time of the incident. If the start time of the incident is not available, then the current time of the Independent Clock 134 is used. The fixed duration is dependent upon the level of reliability that is attached to the Data Source 100 and the type of incident. For instance an incident from data source CHP 106 and relating to a PEDESTRIAN ON THE ROADWAY, may be assigned a default duration of 20 minutes, while an Accident reported by data source TravInfo™ 104, which may have gone through further verification of the data, may be assigned a default duration of 30 minutes. Default durations are typically determined when monitoring data sources and observing the incident durations reported when available.

In case the end time is at a date too far remote in the future, such as more than two days after the current time, this is assumed to be an error in the data, except when the incident is ROAD WORK. The end time is then corrected by combining the current date with the incident end time.

In Step 210, if the end time predates the incident expiry date then the incident is not inserted in the Active Traveler Information Database 130 and the process returns to Step 204 where the next incident is read.

Otherwise, in Step 212, the system 10 reads the incident description. Upon reading and analyzing the description of the incident, the system 10 determines if the incident is a duplicate or not, meaning that the same incident is already in the Active Traveler Information Database 130. A decision is then made to erase the incident from the Active Traveler Information Database 130 or to erase the incident under current consideration.

Therefore, the system 10 evaluates whether an incident that appears to be a duplicate is a duplicate or is an update or correction to existing information. The system 10 then saves the best data, and discards the lesser quality version.

In Step 212, the system 10 may also apply a number of corrections to the incident description, such as translating a number of abbreviations into plain English text. Examples: #1 LANE is translated to FIRST LANE FROM LEFT; 3A is translated to AAA TOW REQUESTED.

In Step 214, the system 10 determines if the base ID of the incident as computed in Step 206 already exists in the Active Traveler Information Database 130. If this is the case then the system 10 takes note of the incident currently listed in the Active Traveler Information Database 130 and with an identical base ID. The system 10 then executes Step 216. Otherwise, the system 10 executes Step 220.

In Step 216 the system determines if the incident is a duplicate. In preferred embodiments of duplicate incident testing, the incident must end after the existing incident, by at least 15 minutes. This test limits the risk of a data source automatically generating an excessive number of corrections within a few minutes; which could result in a large number of updates being dispatches to subscribers, with very few changes in the Information actually conveyed. Other aspects of the incident information may be tested as well. For example, description and/or location information may be tested.

In general, tests designed with certain consideration in mind. For example, one consideration is that some recurring incidents may be continuously updated with only the end time being different. Examples of these incidents include congestion or "heavy traffic" incidents, weather conditions such as wind, ice, or snow. Otherwise, minor differences in the description and location may occur as the incident is not yet completely known. It is suitable to wait a little before the information is completely confirmed and republish or redispatch the incident then.

If the incident is a duplicate, the system 10 returns to Step 204 for reading of the next incident; if not the system executes Step 218.

In Step 218, the system computes a 9-digit ID from the incident ID. If the incident ID already has 9-digit, then it is simply incremented by one. Otherwise if the incident ID has 6 digits, then it is multiplied by 1000. The system 10 then executes Step 222.

In Step 220, the system 10 determines whether the incident description already exists for some incident currently listed in the Active Traveler Information Database 130. If this is the case then the incident currently listed is dropped from the database 130 in Step 222.

In Step 222, the incident currently listed in the Active Traveler Information Database 130 is dropped from the database and the system 10 executes next Step 224.

In Step 224, the incident is inserted into the Active Traveler Information Database 130. In Step 224, the system 10 computes latitude and longitude if missing or corrupted. This computation is completed using the Segment Database 136. In testing, it was found that the method can locate on average 80% of the incidents with missing latitude and longitude.

Not all data sources provide a latitude and longitude together with the description of an incident. In the general case, the system 10 must infer a latitude and longitude from the specification of the intersection of two highways.

For each incident that is not geocoded, i.e. that does not already contain latitude and longitude Information, the address is decomposed into an "inc_ON" highway and an "inc_AT" highway: for instance:
inc_ON US-101 N
inc_AT WHIPPLE AVE
(where "inc_" stands for incident)

Before string comparisons are made, some typical translations between a given data source and the Segment Database 136 are applied. Exemplary translations are:
BRDG becomes BRIDGE
MOUNT becomes MT
PZ becomes PLAZA
EXWY becomes EXPY
PKWY become PKY
AV becomes AVE Note that these translations are applied to isolated words only. For example, AVENUE is not translated to AVEENUE. In addition the following strings are prepared when the specification of a direction along inc_ON was detected:
Opposing direction:
inc_ON_OPP US-101 S
No direction:
inc_ON_NOP US-101

If there is a match with both the inc_ON and inc_AT and one pair (ON:, AT:) for a segment in the Segment Database 136, then the incident is determined to be geocoded and the latitude and longitude recorded in the database are used for the incident.

The match does not have to be exact: this is implemented by going through the list of segments and intersections in the database and assigning a score to each potential match, while retaining the match with the maximum score. The scoring system works in the following order, from the maximum score to the minimum score:

| | |
|---|---|
| 14 | (Unk_ON equals ON) and (unk_AT equals AT) and the specified county for the incident equals the county specified in the database for that (ON,AT) combination: exact match, and maximum score |
| 13 | (Unk_ON equals ON) and (unk_AT equals AT) with a different county (which is the result of errors at typically happens at the boundary between counties) |
| 12 | (Unk_ON equals AT) and (unk_AT equals ON) (inverted) |
| 11 | (Unk_ON equals ON) and (AT contains unk_AT): contains meaning that the string AT contains completely unk_AT (for instance "CAPITOL AV" contains "CAPITOL" entirely) |
| 10 | (Unk_ON equals ON) and (unk_AT contains AT) |
| 9 | (unk_ON_OPP equals ON) and (unk_AT equals AT) |
| 8 | (unk_ON_OPP equals ON) and (AT contains unk_AT) |
| 7 | (unk_ON_OPP equals ON) and (unk_AT contains AT) |
| 6 | (unk_ON_NOD equals ON) and (unk_AT equals AT) |
| 5 | (unk_ON_NOD equals ON) and (AT contains unk_AT) |
| 4 | (unk_ON_NOD equals ON) and (unk_AT contains AT) |
| 3 | (ON contains unk_ON_NOD) and (unk_AT equals AT) (for instance if ON is US-101 S and unk_ON is US-101 N) |
| 2 | (ON contains unk_ON_NOD) and (AT contains unk_AT) |
| 1 | (ON contains unk_ON_NOD) and (unk_AT contains AT) |

The scores are only indicative and may be refined or new matching criteria may be entered. The scoring system requires a single pass through the database (that contains local highways only and is typically rather small). In another embodiment, the scores may be determined using a distance function between two strings such as the Levenshtein Distance known in the art.

On average, at least 80 percent of the incidents lacking geographic coordinates may be geocoded, and thus assigned a location on a map using the abovementioned process, or equivalents thereto.

In Step 226, the system 10 determines whether there are more incidents for the current data source being considered. If this is the case, then the system 10 returns to Step 204 and otherwise, the system 10 executes Step 228.

In Step 228, the system 10 determines whether there are more data sources to be considered. If this is the case, the system 10 returns to Step 202 and otherwise terminates, awaiting for a next scheduled execution.

Figure 3:
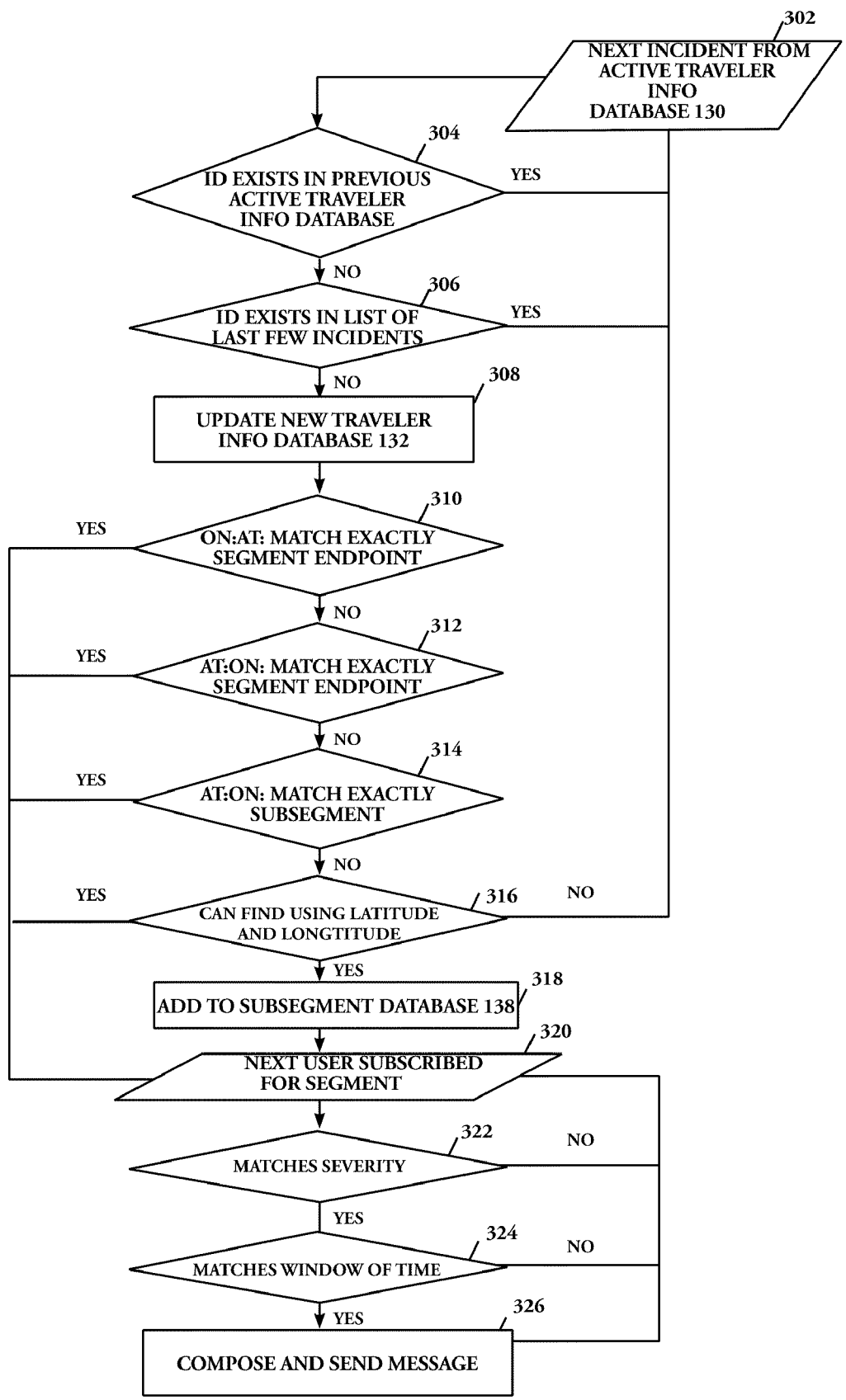
FIG. 3 is a flow chart illustrating the dispatch of traveler information to subscribers.

FIG. 3 describes aspects of the Traveler Data Dispatcher 180. The Traveler Data Dispatcher 180 comprises a Matcher to Segments 182, a Matcher to Severity and Time 184, an Abbreviation Engine 186, and a Transmitter SMTP SMS (Short Message Service)/MMS (Multimedia Message Service) 188.

The Matcher to Segments 182 is preferably implemented with the Steps 302 through 318 illustrated in FIG. 3.

The Matcher to Severity and Time 184 is preferably implemented with the Steps 320 through 324. The Abbreviation Engine 186 and transmitter 188 are implemented in Step 326.

In Step 302, the next incident from the Active Traveler Information Database 130 is retrieved. If there are no more incidents, the process ends.

In Step 304 the system determines whether the ID of the incident already exists in the traveler Information database that was previously active. (Previously active means that the incident was active and published in the previous iteration of the system 10). If this is the case, then the system 10 returns to Step 302, or otherwise proceeds to Step 306.

In Step 306 the system 10 determines whether the ID exists in the list of the last few incidents. If this is the case the system 10 returns to Step 302, and otherwise executes Step 308. Preferably the last few incidents are a list of IDs of the incidents that the system 10 has most recently encountered.

In Step 308, the incident is considered to be new and is inserted in the New Traveler Information Database 132. The incident is also set to be the first in the last few incidents list, and the last incident of that list is removed.

In a majority of the data sources for traveler incidents, the incident is reported on one highway or transit route, in spatial relation to an intersection with another route or stop, such as: Before, after, at, just north of, etc.

As such, in Step 308, the Matcher to Segments 182 attempts to interprets the location of the incident as an (ON: AT:) pair such as: ON: I-580 E AT: GROVE WAY wherein the AT: component of the location may potentially be missing. Preferably, the system looks for the keywords "ON" and "AT", but also for JUST NORTH OF, OR JNO, JUST SOUTH OF, or JSO, etc. and as many similar ways of specifying an intersection location as possible.

The system 10 then builds a first hash-table mapping the ON: AT: location for segments of the Segment Database 136 to segment ID and well as a second hash-table mapping the ON: END: segment location to segment IDs. For instance, for the segment 10001,CA-85 S,FREMONT AVE,HOMESTEAD RD the ON: AT: key for the first hash-table is: CA-85 S FREMONT AV and the ON: END: key for the second hash-table is: CA-85 S HOMESTEAD RD.

Both keys are mapped to the segment ID, 10001 in the hash-tables. Preferably both hash-tables are built ahead of time, because they are the same for all the incidents being treated and only depend upon the Segment Database 136. Step 310 is executed next.

In Step 310, an ON: AT: key is built for the incident in the same fashion as for the list of segments in Step 308. If there is an exact match in the first hash-table then it is determined that the incident is matched to a segment and the system executes Step 320 next (for instance if the ON: AT: key is CA-85 S FREMONT AV then there is an exact match in the first hash-table and the incident is determined to be on Segment 10001). Otherwise if there is an exact match with the second hash-table the system executes Step 320 as well.

Otherwise, in Step 312, the key is reversed, meaning that the AT: ON: key is built for the incident. If there is an exact match with the first hash-table the system executes Step 320. Otherwise if there is an exact match with the second hash-table the system executes Step 320 as well.

Otherwise, in Step 314, the system 10 goes through the Subsegment Database 138. A subsegment is a portion of a highway segment, that does not fully extend from the segment origin (or AT:) to the segment destination (or END:). A subsegment may simply be an intersection, wherein the (END:) information is unavailable, or even simply a place, wherein both the AT: and END: information is unavailable. But in all cases the subsegment must be associated with a reliable latitude and longitude. Subsegments are particularly useful because incidents may be reported inside a segment as opposed to a segment endpoint. As an example of subsegment, one segment 12345 along US-101 S is defined between MONTEREY RD and CA-25 and is assigned a latitude and longitude values of 36.973988 and −121.555046. The latitude and longitude of a segment are typically representative of the center of the segment. One particular subsegment of this segment would be 60235 on US-101 S at CASTRO VALLEY RD with a latitude of 36.967833 and a longitude of −121.552667. A subsegment is typically associated with a numeric ID that distinguishes it from a segment, typically associated with a lower number ID. A subsegment is also associated with the ID of the larger segment it belongs to: 12345. A subsegment may also be created for a new spelling or denomination of an existing segment endpoint.

In Step 314, the system 10 tests the incident location as an ON: AT: key with the subsegment Database. If an exact match is found, then Step 320 is executed next, otherwise Step 316 is executed.

In Step 316, the system 10 attempts to create a new subsegment corresponding to the current incident, as no corresponding segment or subsegment could be found so far.

For instance an incident may be reported on US-101 S at CASTRO VALLEY RD with a latitude of 36.967833 and a longitude of −121.552667.

The system 10 computes the distance in (latitude, longitude) space between the incident location and each road segment along the same road of the incident (Only the road segments on US-101 S are searched in the previous example. Searching only those types of segments is easily performed by matching the string in the ON: portion of the segment description). The closest road segment is retained. The distance in latitude and longitude is then approximately translated into a Euclidean distance using the following formula: 0.01 degrees of latitude or longitude correspond to about 1 Kilometer.

If the Euclidean distance in approximate kilometers is sufficiently small (about one kilometer) then the incident is determined to occur on a subsegment of the segment and the incident is determined to be localized on the segment. The system 10 then proceeds to Step 318. Otherwise the system 10 returns to Step 302 and considers the next incident.

In Step 318, the subsegment determined in Step 316 is added to the subSegment Database 138, and the system 10 proceeds to Step 320.

Another advantage of the above described methods for matching incidents to segments is that in case Information is only partially available (such that the END: or even AT: and END: of an incident, the system may still be able to find an exact match in the Segment Database, considering the missing Information as an empty string and performing a matching on the remaining, available Information. Since other parts of the system are dedicated to computing latitude and longitude of an incident when such latitude and longitude are unavailable, in most cases through Steps 310, 312, 314, and 316 incidents may be matched to a segment.

Another advantage of the present invention is that the incident databases gradually increase in accuracy as more and more incidents are processed: subsegments are being continuously created and the matching of incidents becomes increasingly flexible.

In Step 320, the system 10 examines the next user from the list of users subscribed for alerts relating to the matched segment. If there is no more user subscribed for the matched segment, the process ends.

In Step 322, if the severity of the present incident matches the level of severity that the user has requested for the segment (specifically, if the severity number is lower, as lower numbers correspond to more severe incidents in the present invention) the system 10 proceeds to Step 324 and otherwise the system returns to Step 320.

In Step 324 the system 10 examines the predicted window of time for the incident, and determines if there is any intersection between the predicted window of time for the incident and the window of time the user watches the segment for. This is preferably performed by making comparisons of precedence between dates. Determining whether two windows of time overlap is analogous to determining whether two linear segments overlap in one dimension, and the techniques are generally known.

If the two windows of time overlap, the system 10 proceeds to Step 326, and otherwise the system 10 returns to Step 320.

In Step 326 the system 10 prepares a message by means of compiling and especially abbreviating the Information, and dispatches a message to the user on the user preferred address.

In preferred embodiments, the system 10 preferably interprets any delivery address (cellular telephone, pager, email) as an email address. The system 10 looks in a lookup database for converting a wireless provider name to a valid email address suffix publicized by the wireless provider. For instance, a wireless device may be mapped using a convention such as wirelessdevicenumber@mobile.wirelessdeviceprovider.net in the lookup database. The lookup database is compiled by collecting addresses publicized by wireless providers.

The system stores a primary and a secondary address for each user, which may be the same. The user may attach either the primary or the secondary address to any segment that the user watches. For instance a user may want to receive alerts on a cell phone (primary address) on her way to work in the morning, and at work on her company e-mail system (secondary address) right before she takes her car to return home.

To send a text message on a cellular telephone, the message must be typically abbreviated to fit in 100 to 160 characters, depending upon the wireless provider. The following techniques have been implemented in the Abbreviation Engine 186 for this purpose. Abbreviation engine 186 therefore provides a benefit of formatting traveler information for dissemination to systems with certain formatting requirements, as well as a separate benefit of enhancing information transfer. That is, as a user becomes accustomed to a set of abbreviations, the user is able to more quickly read and digest the traveler information that if the traveler information were spelled out in long form.

Therefore, it is considered that the following embodiments of the Abbreviation Engine 186, and the terms used in association with the Abbreviation Engine 186 are not limiting and only exemplary of how an Abbreviation Engine 186, or equivalent technique, may be used in conjunction with traveler information.

At a high level, only 6 types of information are transmitted in the message: 1) email address of sender 2) location where the problem occurs 3) window of time for the incident 4) incident type and subtype 5) status of the incident 6) description of the incident (at least, the beginning thereof).

The origin email address is necessary for the Information to be sent at all through the Internet. The smallest possible valid email address for the business is preferably used.

The location of the incident as an intersection is obtained by juxtaposing the two roadways participating in the intersection, with an @ sign in between. Only the first 12 characters are kept, and any trailing space is removed. An example is provided:
E SAN MATEO BRIDGE
becomes
E SAN MATEO (11 characters) and not:
E SAN MATEO (12 characters)

The begin and end time, displayed for instance as: "at10:00 PM til11:PM" (the days are eliminated, assuming it is today as the information is dispatched very quickly and the date may be carried elsewhere in the header of the message by the provider).

Type and SubType of incident: a look-up table of abbreviations for single words is used. Examples of abbreviations and corresponding terms are provided:
maintenance is maint
operations is ops
obstruction is obstruct
roadway is rdway
vehicle is veh
injury is inj, Once these substitutions are done the first 15 characters are kept, and any trailing spaces are removed.

Status: a look-up table of abbreviations for single words is used. Another example is provided:
blocked is blkd
center is ctr
left is lt
right is rt
two is 2
three is 3
traffic is traf Description: to determine the available character count, the number of characters already used in information types 1 through 5 above is subtracted from 160, after removing codes, special symbols, and potentially using further abbreviations. Trailing spaces are removed.

The final message may be presented as follows: 1-80 W @POWELL ST at5:20 PM til5:47 PM disabled veh rt lane blkd WB I-80 just after Powell St Representing about 90 characters automatically abbreviated from fairly extended and detailed incident information, which originated in a prior art system as the following:

<!-- Traffic Incident: #397772 -->
Subtype:      disabled vehicle
Started:      TUE 02/19/02        Updated:   TUE 02/19/02
              05:20:00PM                     05:20:12PM
Expected End: TUE 02/19/02 05:47:08PM
Reported:     By:  CHP    Time:   TUE 02/19/02 05:47:08PM
Location:     On:  I-80 W  At:    POWELL ST -continued City: EMERYVILLE   County:          ALAMEDA
Coordinates:  Lat:  375017N         Lon: 1221747W
Status: right lane blocked
Advice:       drive carefully
Description: 1705-WB I-80 just after Powell St stalled vehicle blocking the right lane. 5131

The message is typically dispatched to its destination email via an SMTP server, however connecting to an SMS gateway would also be possible. A wireless provider will typically operate an SMTP gateway, which will then transmit the message to the recipient.

Preferably the message header incorporates a number of notification requests following the Delivery Service Notification (DSN) standard. In this way, the System 10 is typically notified of whether the message was received, read or deleted before being read, and the time of delivery. Not all gateways respond to the DSN standard and therefore, the system 10 cannot rely on receiving any or all of the notifications. An expiration date or time tag may also be added, indicating a time at which the information will stop being relevant, in case the delivery would be late. Some e-mail clients such as Microsoft Outlook acknowledge the expiry date.

Periodically, a program, such as the Diagnostic Program 194 is launched to examine the proper functioning, or the health, of the system 10. In one embodiment, the program examines the logging files. The Diagnostic Program 194 looks at the numbers of incidents published. The Diagnostic Program 194 determines whether there is an abnormal pattern in the numbers and origin of incidents produced. For a given source of data the number of new incidents per day varies from day to day but almost never goes down to zero. Exemplary statistics are as follows: x A=Total number of new incidents reported in the last hour.
B=Average number of incidents reported at any given time in the past hour
C=Average number of incidents published at any given time in the past hour: A number equal to zero would mean that the publishing side is completely devoid of data, which would certainly be indicative of a technical problem.
D=Variation between the number of incident reported by a data feed: some variation is a good indicator of a healthy behavior for the data source.

As incidents become static and new incidents are just being reported, the exact number of incidents reported at a given time is necessarily subject to some minor variations. This test compounds these variations over a period of one hour or so.

If statistic D is high, it is very likely that the data source is healthy. D is a positive value adding/compounding all absolute values of the differences between the number of incidents reported at a given time, and the number of incidents reported in the previous iteration.

E is a positive or negative value derived from adding all the differences between the number of incidents reported at a given time, and the number of incidents reported in the previous iteration.

F=number of incidents currently being published.

The email address of an administrator for a given data source can be recorded.

If any test, or combination of tests indicates a problem, a simple algorithm, such as the exemplary one below, is used to detect the problem. An email message containing the statistics and the algorithm's guess is dispatched to the administrator(s) as well as individuals responsible for the data source. In addition, a message indicating technical problems may be displayed on the publishing side. (The later is reserved for situations where the number of published incidents is zero).

One example of criteria that is applied to decide whether there is a problem on the server or not is a test that evaluates if A is equal to zero, then check whether F is less than a minimum threshold. If this is the case, then a preliminary determination is made that there is a problem, (meaning, that in addition of no new incidents coming in, the currently published number is getting very low) or E is less than a minimum negative threshold (meaning that the pool has been decreasing in size).

If this preliminary determination is not made, then the tests stop and no email message is sent or problem reported to an administrator.

If this preliminary determination is made, then the system checks whether B equals zero. If this is the case, then the algorithm returns an estimation of the problem as: "probably new data cannot be transmitted to the server. Otherwise if D equals zero then the algorithm returns: "probably new data cannot be transmitted to the server" Otherwise if F equals zero and B is greater than zero (some incidents reported but none published) "Incidents are transmitted to the server but unpublishable"

Otherwise the system 10 determines that there is no significant problem after all.

In further or other embodiments, the following criterion could be used as well: G=Ratio between number of incidents reported and number of incident published.

A value for G of close to one, is a good indication that the system works well overall. If G is low but D is high, there is an indication of problems on the server/publishing side. System 10 diagnostics may be completed on a predetermined schedule, or as required.

The System 10 provides facilities for the management of the user preferences and subscriptions. The following Table 2 lists exemplary information that may be displayed by the System 10 for each user: the user's email address; the user's first name; whether the user's email address was confirmed by the user's response to an email; A potential referral code, whether or not the user is currently subscribed to alerts, and a potential date of subscription end.

column of Table 2, and then activates one button of a collection of buttons labeled as follows:

"ComposeMail", for composing an email message to one or several users

"TextMessage", for composing a text message to one or several users

"Subscribe",

"Unsubscribe",

"Add1Week",

"Sub1Week",

"Add1Month",

"Add6Months", for managing the user's subscription

"Confirm", for marking a user's address as being confirmed

"MailCoupon",

"MailConfirmationCode", for sending account confirmation information to a user via an email message "MailCoupon", for sending a discount coupon to a user via an email message "Delete", for deleting a user.

It is considered that these features, are only exemplary of additional features that may be available to a super user, and are therefore not limiting of the invention herein.

When displaying a map of traffic incidents, conventional systems typically use instead a single type of incident icon, and the user must inquire further to determine the type and importance of the incident. Other conventional systems use no more than three or four different icons, which is not as precise as in the present invention. When displaying a list of incidents, conventional systems use a textual depiction without displaying a specific icon representation for each specify type of incident. The system 10 as disclosed herein uses a graphical icon publisher, wherein classes of traveler information are displayed according to certain graphical icons. Non-limiting examples of classes of traveler information that may be grouped under a single graphical icon type are given above in Table 1.

Figure 4:
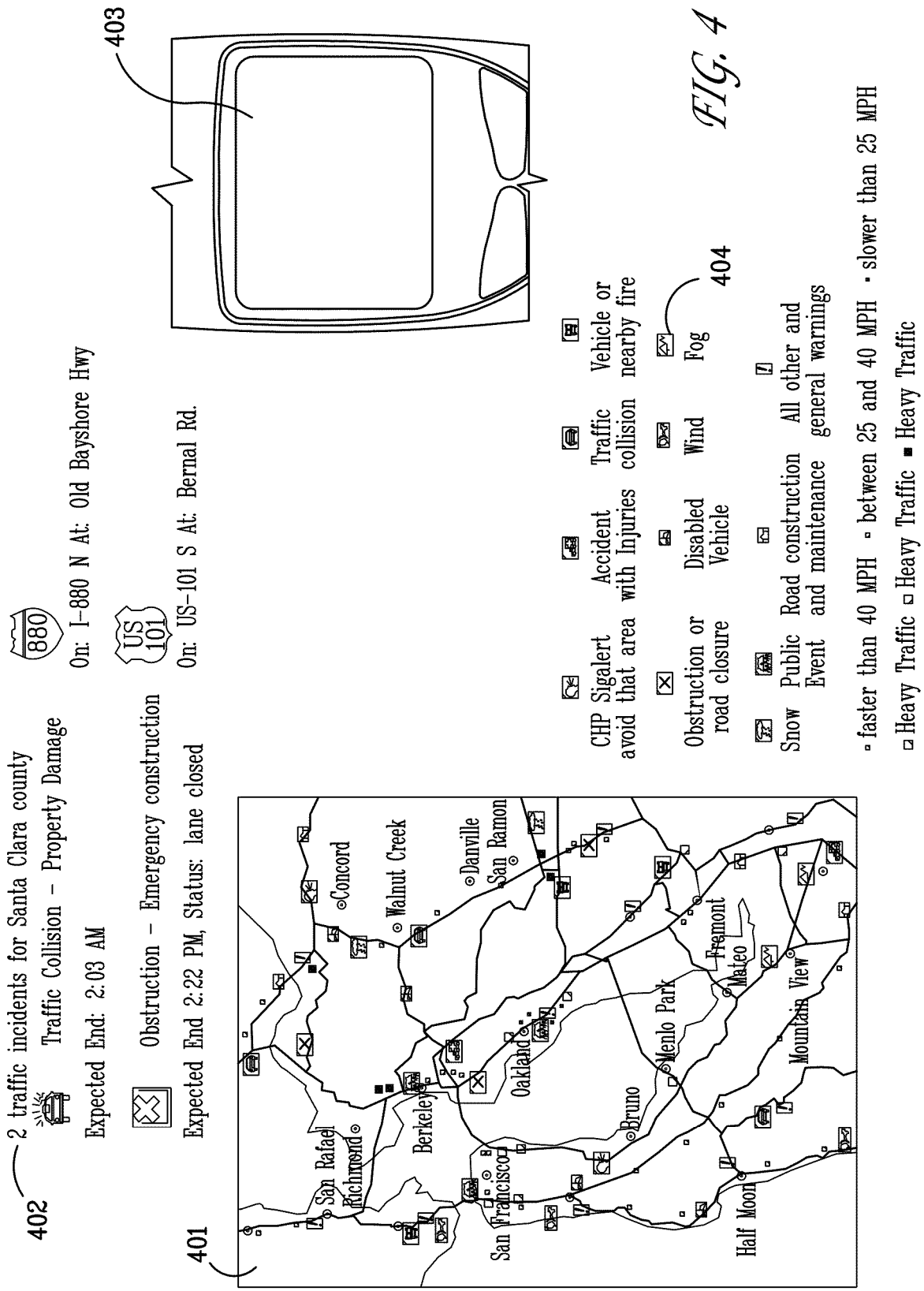
FIG. 4 is a pictorial illustration of the operation of the present invention in publishing and disseminating traveler information.

Referring to FIG. 4 in a List of Incidents 402 graphically depicted in the HTML language, and viewable using any HTML or Web browser, incidents are displayed for each county with more severe incidents being displayed on the top.

TABLE 2

| Select User | First Name | Confirmed | Referral code | Last Subscribed | visit | Created | Primary address | Secondary address | Alerts sent this month | Alerts sent so far |
|---|---|---|---|---|---|---|---|---|---|---|
| <link to user profile here> <link to user profile here> | Alex | Yes/ Confirmation code | SFBT | Yes/ no date | date | date | 123456789@ xxx.yyy | user @zzz.ttt | 15 | 200 |

A super-user of the System 10 may view and update the profile of a user. A super user may access a user profile by selecting a displayed link to a user profile displayed in Table 2. A super user may thus enter user preferences manually in case the user would prefer or request a super-user to do so. A super user may also subscribe and unsubscribe a user, as well as add or subtract a period of time to the subscription. A super-user may also compose and send an email message to one or more users, or compose and send a text message to one or more user cell-phones or pagers.

In a preferred interface for such super-user actions, the super-user checks one or more check-boxes in the "select"

When displaying a Map 401, the present invention uses larger Graphical Icons 404 for more severe incidents, and typically uses more intense and saturated colors for depicting more severe incidents. The system may thus represent a significant number of incident types such as ten, twelve or more, and a viewer may readily assess the type and importance of the incident with a single look at the overall Map 401. The icons also differ in shape: square, rectangle that is wider in the horizontal direction, rectangle that is wider in the vertical direction.

Referring to a map in FIG. 4, the system 10 is capable of representing a large number of incidents at the same time, as a large number of incidents typically occur at the same time in a large metropolitan area such as the San Francisco Bay Area.

In preferred embodiments, Graphical Icons 404 on a Map 401 are also drawn in inverse order of severity: most severe (and larger) first followed the least severe (smaller). In this way, if overlap occurs, the smaller icons only partially obscure the larger ones and both are visible.

When the user's mouse goes over an incident icon, detailed information about the incident is displayed on the user's computer screen. In case of overlap, the most severe information is displayed. In preferred embodiments, this is achieved by listing the most severe information first. In further embodiments, the size of the Graphical Icons 404 in general may be reduced so as not to obscure other Graphical Icons 404, or the Map 401. In these embodiments, the size of each Graphical Icon 404 may increased as a user points to the Graphical Icon 404, thereby enabling the user to obtain a better view of the graphic. This feature may be used with, or without, the presentation of detailed information.

A conventional Cellular Phone 403 receiving traveler information produced and dispatched by the present invention is also shown on FIG. 4. Using the Abbreviation Engine 186 of the Traveler Information Dispatcher 180, the most important information about the incident may be entirely displayed on the small screen of a conventional cellular telephone, and this invention allows a user to understand the location, specific nature, begin and end time of an incident presumably affecting the user in his or her traveling pattern.

Understanding the location, duration and nature of the incident does not require extensive manipulation or text scrolling of the Cellular Phone 403.

Figure 5:
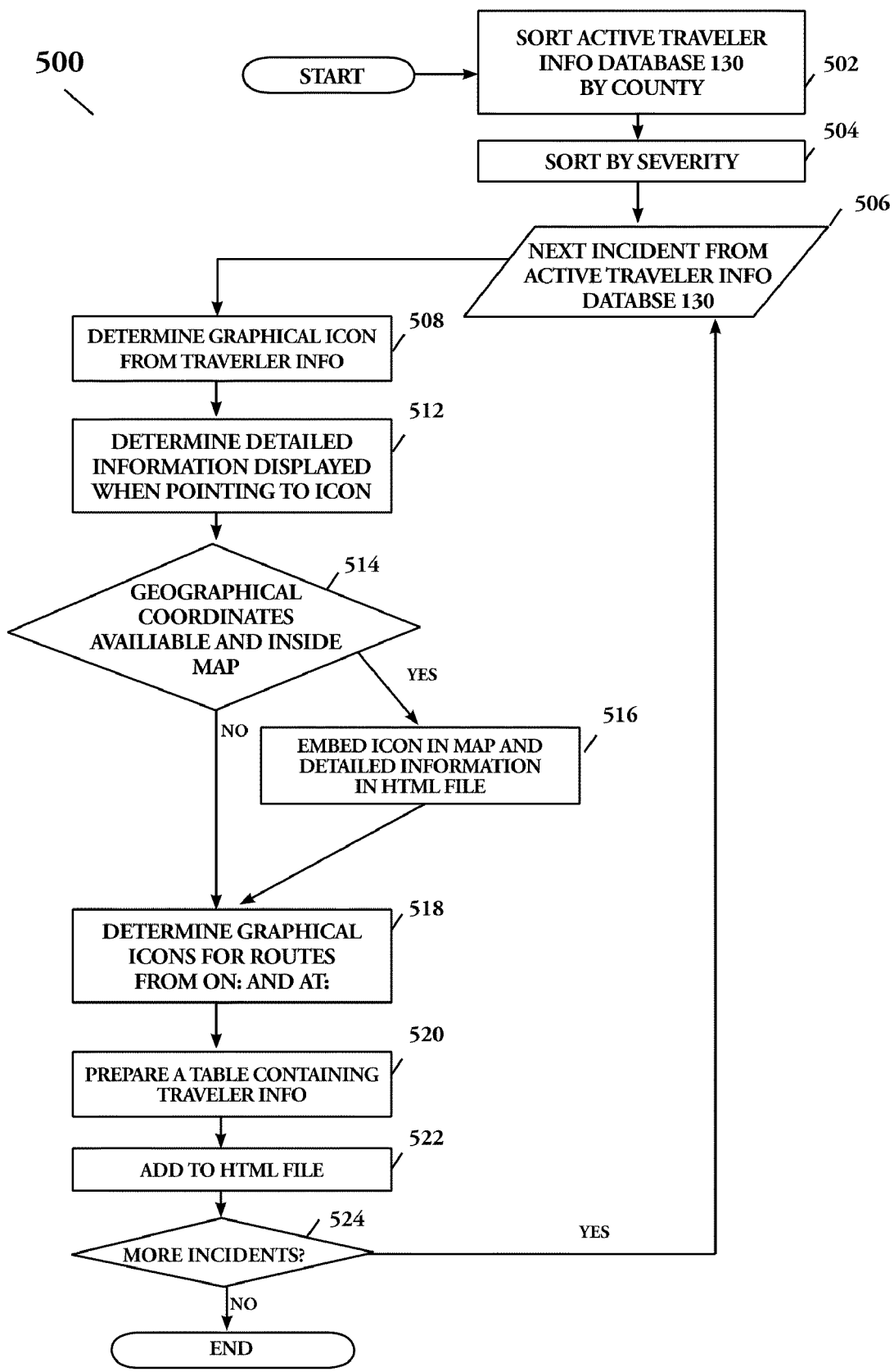
FIG. 5 is a flow chart illustrating an exemplary process of publishing traveler data.

FIG. 5 is exemplary of further aspects a preferred embodiment of the Traveler Data Publisher 170, including a Publishing Process 500. The Publishing Process 500 is preferably invoked frequently, such as every minute.

In Step 502, the Active Traveler Information Database 130 is being sorted by county.

In Step 504, the incidents from the Active Traveler Information Database 130 are sorted in decreasing order of severity, for a specific area, such as within a county.

The next incident from the Active Traveler Information Database 130 is retrieved in Step 506.

In Step 508, a graphical icon is chosen for an incident depending upon the type, subtype and description of the incident. This is preferably accomplished by searching the type, subtype and description of the incident for keywords and keyword combinations that preferably correspond to a graphical icon. For instance "Collision" or "Accident" combined with "Ambulance" or "Injury" or "Injuries" typically corresponds to an INJURY ACCIDENT icon.

In Step 512, detailed information for an incident is determined using the incident's type, subtype, status, location, time, and detailed description. The detailed description is preferably displayed as a user points to the incident icon, for instance using a mouse or other pointing device.

In Step 514, geographical coordinates for the incident are being retrieved when available. If geographical coordinates are available and designate a location inside a map then Step 516 is executed next. Otherwise, Step 518 is executed.

In Step 516, an icon is being embedded in a map at a location corresponding to geographical coordinates. The location is determined by converting latitude and longitude data to pixel (picture element) coordinates in the map. Latitude and longitude are converted using the latitude and longitude at the map center, knowledge of how many pixels in the map correspond to a degree of latitude and longitude deviation, and using conventional trigonometry. An icon is embedded at the pixel coordinates by copying the icon into the map. Detailed information for the incident is also being embedded in an html file. The system then executes Step 518.

In Step 518, graphical icons are being chosen for routes intersecting at the location of the incident. Graphical icons are determined by creating an icon name from a route name; A route name is provided in the incident location information. Then, it is determined whether the icon name corresponds to an existing icon, in which case the icon is chosen. Otherwise no icon is chosen. As an incident location is typically described as an intersection of two highways, two graphical icons are typically chosen.

In Step 520, an html table is prepared for formatting the various elements of an incident information. The table allows to position an incident icon, route icons, the type of incident, and other incident information in a manner suitable for clear exposition, as illustrated in a List of Incidents 402. Table gridlines are preferably invisible to the viewer.

In Step 522, formatted incident information is added to an html file, suitable for viewing.

In Step 524, if there are more incidents Step 506 is executed next and otherwise the Publishing Process 500 ends.

In some embodiments of the present invention, real-time or predictive traveler information may be provided. This information may be utilized in the context of, for example, routing whereby an optimal route is supplied to a user. The optimal route is dependent upon factors such as real-time and/or predictive traffic congestion. This predictive data may be representative of archived data over a variable window of time to reflect certain seasonal or other cyclical variations.

For example, forecasts may be generated for a given route based upon a calendar of events, the time and day of the week and/or sensor data providing the speed of traffic along portions of a particular road, highway or other thoroughfare. Through the combination of real-time speed information with routing computations, a profile may be generated wherein the expected travel time for any route for a reasonable period of time is provided.

In such an embodiment, a routing engine may take into account real-time speed information as well as predictive speed based upon calculations derived from predictive congestion models as they relate to historical and predicted traffic patterns. The routing engine may utilize an embodiment of the A* search technique (also referred to as the heuristic search technique). The A* technique uses estimates on distances to a destination to guide vertex selection in a search from the source. The A* technique is further described in Microsoft Research Technical Report MSR-TR-2004-24, the disclosure of which is incorporated herein by reference.

The present predictive traveling embodiment further utilizes a user interface for selecting a start point, end point and any intermediate waypoints. The user interface further allows for a determination of whether the routing engine should compute a fastest route or a shortest route.

In the aforementioned routing engine, all road nodes and segments that are relevant for routing are loaded into a shared memory. The shared memory overcomes the difficulties that the A* algorithm would otherwise encounter in searching through a large number of road segments to find an optimal route, those road segments being fetched from a database.

Effective utilization of the A* algorithm further requires the specification of a weight for each aforementioned road segment as well as an estimate of the total weight to reach the destination. Exemplary segment weights include segment length, segment travel time using a segment speed for a base map, segment travel time using speed from real-time traffic flow information (e.g., sensors, toll-tags and the like), and segment travel time using predicted speed for a given day or time of day. These segments weights are exemplary in nature and other weights are envisioned as being within the scope of the present invention. Segment travel time is obtained by dividing segment length by segment speed.

With regard to the aforementioned road segments, an array of historical speed measurements are maintained; for example, one for each ten minute interval in a day thereby resulting in 144 such intervals. Further, these intervals are maintained for each day of the week (seven such days), holiday departure and return dates (two such days) and other potentially meaningful days as they pertain to traffic conditions (e.g., known road closures or special high-traffic events such as sporting events. At least 144×9 historical speed values are maintained for each segment.

Each time a new speed measurement is available for a road segment, that is, a sensor reading is obtained and validated to be a correct measurement, the historical speed value corresponding to that segment, 10 minute interval and day is retrieved, and is updated according to the following exemplary formula: historical_speed_value=(1−p)*historical_speed_value+p*new_speed_measurement. By adjusting the p value, the window of time for which the historical_speed_value pertains is influenced.

For example, with a new speed measurement available every three minutes and wherein p=0.02, three new speed measurements typically contribute for a given 10 minute interval. After one week, the influence of a new speed measurement is multiplied by $(1-p)^3=0.94$. After 4 weeks, the speed multiplication factor is $(1-p)^{12}=0.78$. After eight weeks, the factor is $(1-p)^{24}=0.62$. As such, a given speed measurement gradually loses its relevance over time and is replaced by newer speed measurements.

Certain embodiments of the present invention allow a timestamp to be recorded for each segment thereby recording the time of latest speed update. After a certain duration, the historical values for the segments can all be invalidated as they have become too old to be relevant and/or accurate. In this manner, the historical speed values are typically updated slightly every three minutes.

Due to the quantity of data to be processed, the update preferably occurs within computer memory rather than through accessing database software on storage media although data can be stored or backed up on a regular basis (e.g., once a day).

Figure 6:
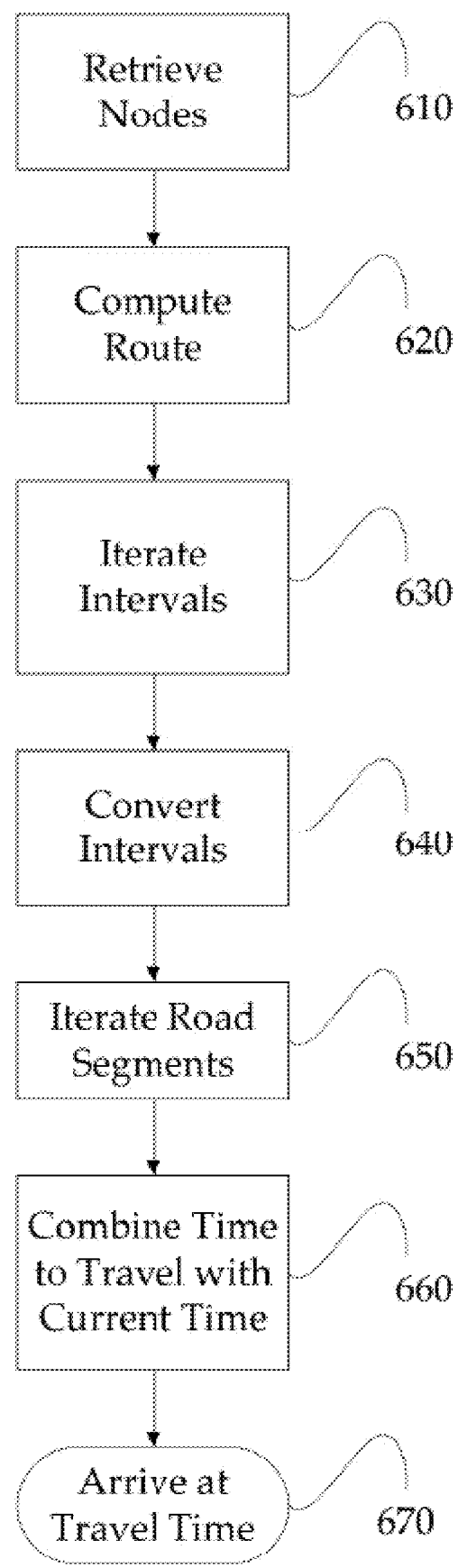
FIG. 6 is a flow chart illustrating an exemplary process of computing travel time.

As shown in FIG. 6, using the historical values stored as explained, a travel time profile may be computed 600 as follows. In step 610, the start and finish nodes of a route are retrieved. The routing algorithm is then used in step 620 to compute a route from start to finish including retrieval of an ordered list of road segments.

In step 630, on a given day for which a travel profile is requested, 10 minute intervals are iterated. In step 640, the 10 minute intervals are converted to a time of day. For example, interval zero might correspond to midnight while interval 143 would correspond to 10 minutes before midnight (i.e., 23:50).

In step 650, starting with a travel time of zero, the ordered list of road segments is iterated. For each segments, the time to travel that segment is computed by dividing the segment length with a historical speed value for that segment and corresponding to the current time of day. In step 660, the resulting time to travel the segment is added to the current time of day as well as pre-existing travel time.

In step 670, once the ordered list of segments is completely processed, the travel time is obtained. By repeating this process for each 10 minute interval on a given day, a travel time is obtained for each such interval; this time can be graphed.

The end result is a routing computation wherein the following information may be reported: (a) a route length; (b) an ideal trip duration if the selected route is un-congested, that is, prescribed speeds on highways as reported in the aforementioned base map; and (c) real-time trip duration that takes into account current congestion. Congestion may be real-time or predictive based upon a particular time of day (e.g., rush hour or traffic related to a particular event such as planned construction, holiday traffic or a sporting event). An exemplary routing computation report interface 700 reflective of this information is shown in FIG. 7.

The routing computation report interface 700 reflects a particular route 710, the distance 720 to traverse that route, the current travel time 730 and the ideal travel time 740. Route 710 may be titled based upon a particular destination (e.g., Sacramento or Seattle) or the nature of the point-to-point route (e.g., home 2 work). Route 710 may also be titled based upon, for example, the actual route traveled (e.g., highway CA-85). Distance 720 is the distance between the point of origin and the point of termination. Current 730 and ideal 740 travel times correspond to the reported information described above.

The routing computation report interface 700 further allows for the creation of a new route or the modification of a pre-existing route through, for example, hyperlinks in an HTML-based interface.

Figure 8A:
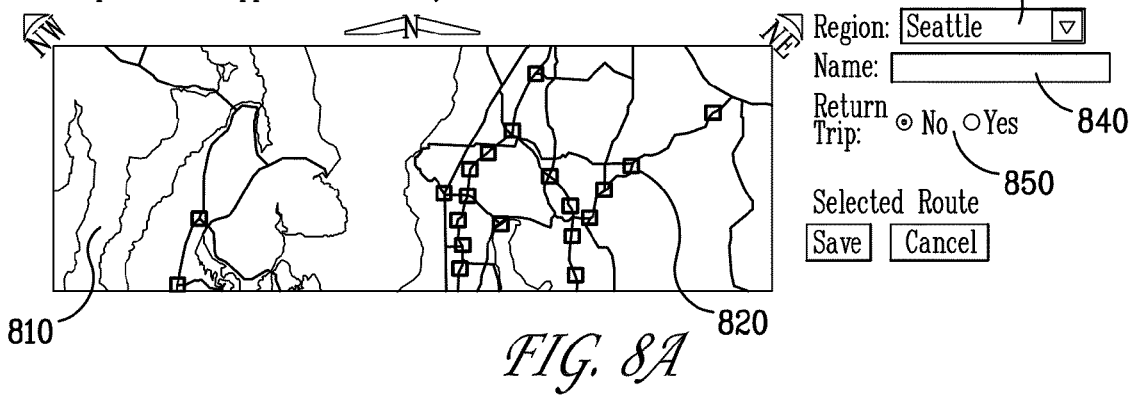
FIGS. 8A-C are pictorial illustrations of an exemplary route creation interface.

FIG. 8A illustrates a route creation interface 800. In route creation interface 800, a user is presented with a map 810 populated with points 820 that may be utilized as a start, end or waypoint. Points 820 may be representative of highway ramps, mile markers, major cross streets or any other point wherein a destination may originate, terminate or pass-through. In an embodiment of the present invention, points 820 are designed to be representative of useful points for selecting a route (e.g., intersections of highways, cities or major landmarks).

The number of points 820 may increase based on the particular magnification of the map 810. For example, a regional map may reflect only a few points 820 whereas a city map may reflect a larger number of points 820 in that particular points of interest as they pertain to starting, terminating or passing-through on a particular journey are more easily identified. Points 820 may be selected through the use of a mouse (e.g., point-and-click) or through the use of a keyboard (e.g., through tabbing) or via any other means of selection (e.g., through use of a stylus on a handheld device).

The particular map 810 displayed may be controlled through a drop-down menu 830. Drop-down menu 830 may reflect a list of all available maps. In the present example, drop-down menu 830 reflects the selection of a map 810 of the Seattle, Wash. area. The route being generated through the selection of points 820 may be named through the use of naming tool 840. The name of the route as provided through naming tool 840 will correspond to route 710 as illustrated in FIG. 7.

Route creation interface 800 further offers the ability to automatically generate a return trip route through return trip selection tool 850 without having to manually re-select points 820 in a reverse order offering added convenience to a user of interface 800. Once a user has generated a route, named the route through naming tool 840 and determined whether they wish to automatically generate a return trip through return trip selection tool 850, the route may be saved by clicking on the <save> button 860. By clicking on the <save> button 860, the route will be uploaded to routing computation report interface 700. Alternatively, the route may be disposed of by clicking on the <cancel> button 870.

Figure 8B:
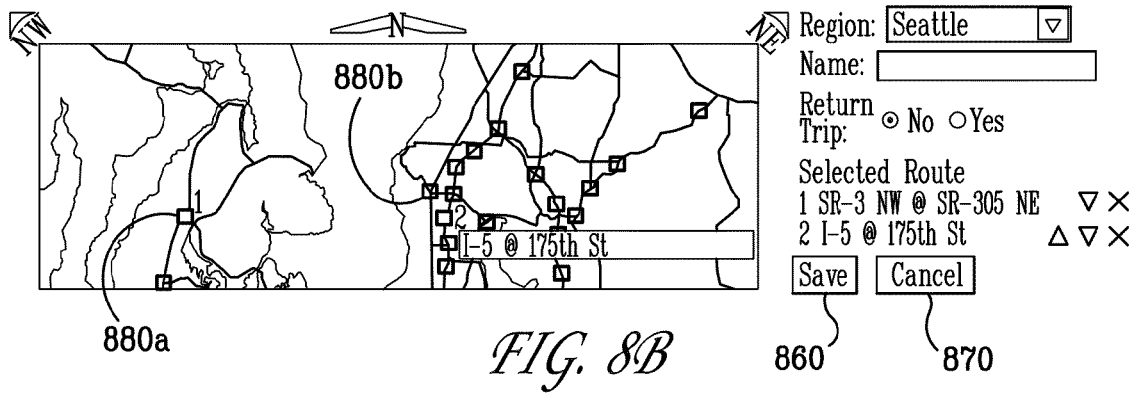

As a user navigates about the map 810, and more particularly points 820, in route creation interface 800, information corresponding to a highway exit or other position may be rendered in the interface 800 as is reflected in FIG. 8B. Once two points 810 have been selected (selected points 880), a route is computed by the routing engine from the first point to the second point and displayed as a part of the selected route 890 and also displayed on the map 810. If a user has utilized the aforementioned return trip selection tool 850, the second route is entered into the system simultaneously in the opposite direction of travel.

Figure 8C:
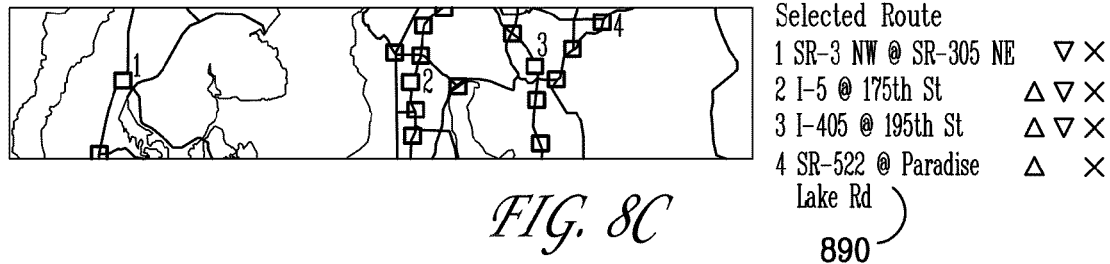

As a user continues to select points (880), the last point 810 entered along the route is considered the destination with all other intermediate points 810 deemed to be waypoints. Selected points 880 may be promoted, demoted or even deleted as to alter the course of the route. For example, in FIG. 8C, a selected route 890 is displayed wherein four selected points 880 are shown as a part of that route (SR-3, I-5, I-405 and SR-522). The numbering of those selected points 880 is graphically illustrated on map 810. A promotion arrow next to each selected point 880 offers promotion of the point whereas a demotion arrow offers alternative demotion of the selected point 880 as a start, destination or waypoint. A deletion 'X' offers the aforementioned ability to eliminate a selected point 880 from the selected route 890.

Once a selected route 890 has been established through interface 800, the routing engine determines travel time by compounding the weights of the segments that compose the shortest or fastest route. Depending upon the weights that are used (e.g., ideal speed, speed from real-time congestion, speed from predicted congestion), different travel times may be reported.

Figure 9A:
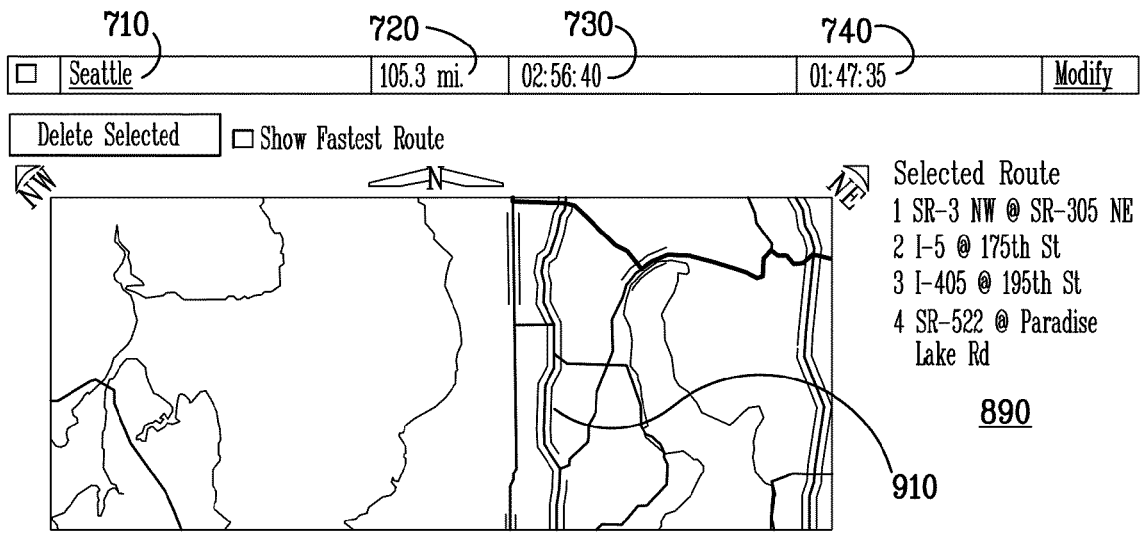
FIG. 9A illustrates an exemplary selected route interface.

For example, in FIG. 9A, the selected route 890 is shown with corresponding route title 710, distance 720 and travel time information: current 730 and ideal 740. As shown by the temporal disparity between current travel time 730 (2 h, 56 m and 40 s) versus ideal travel time 740 (1 h, 47 m and 35 s), this route is by no means an expedient route due to high traffic volume as may be indicated by road colorations 910. Road colorations 910 may be reflective of high traffic (e.g. red colorations) or smooth, uninterrupted traffic flow (e.g. green colorations). Not all points on selected route map 900 may evidence a road coloration 910 as some portions of road or thoroughfare may not allow for calculation of real-time or predictive traffic conditions (e.g., no sensors or traffic reporting).

Figure 9B:
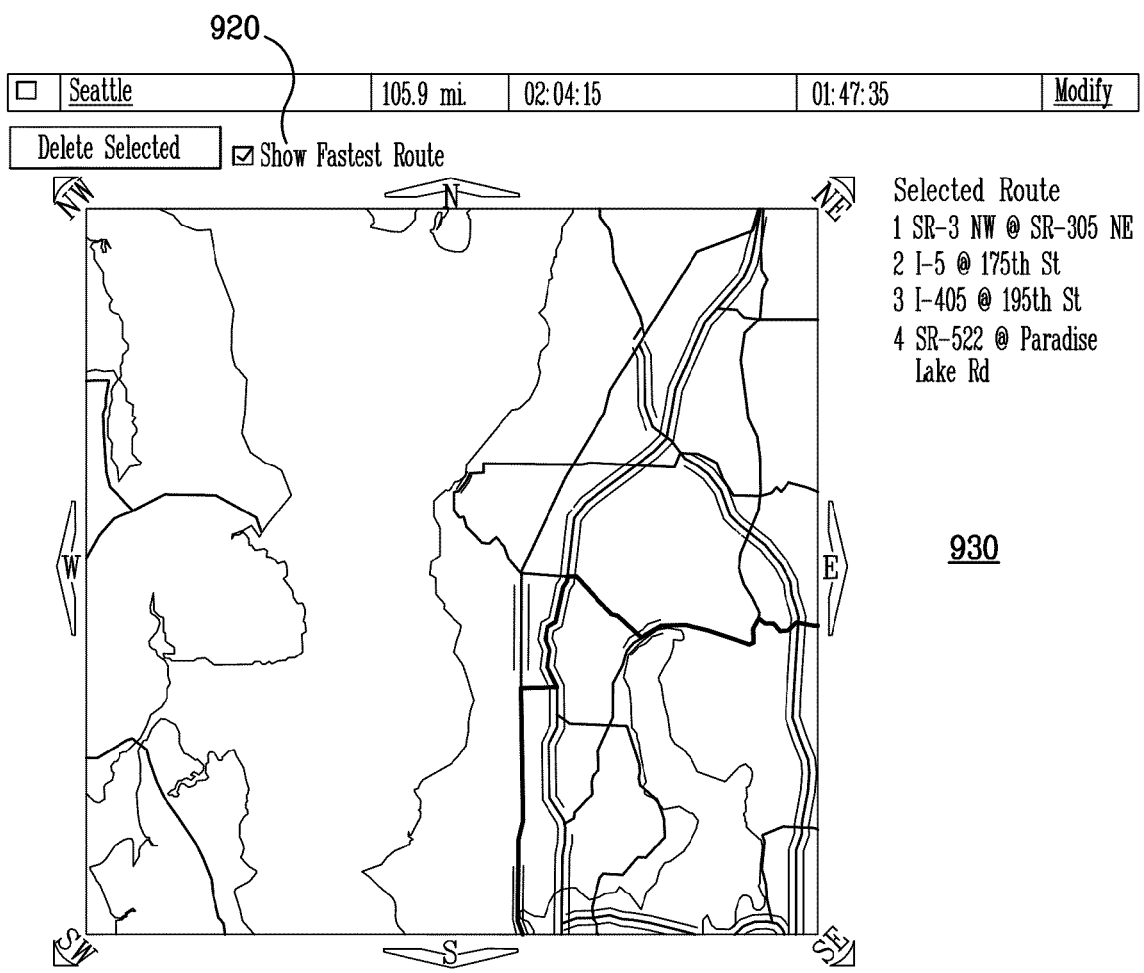
FIG. 9B illustrates an exemplary fasted route interface.

In the instance that the selected route 890 is not the fastest route, a user may presented with a <Show Fastest Route Tool> 920 as illustrated in FIGS. 9A and 9B. Upon selection of the <Fastest Route Tool> 920, the routing engine will re-calculate a route between the point of origin and selected destination and display the same as shown in the fastest route map 930 of FIG. 9B. If the routing engine has already calculated the fastest route (e.g., in a parallel calculation with the selected route 890), then the new route is merely displayed. In some embodiments, the fastest route (or certain portions thereof) may be overlaid with the selected route 890. It should be noted that in some instances, the shortest route may be the fastest route notwithstanding existing traffic delays.

In some embodiments of the present invention, an alert may be sent to a user if the delay in a selected route 890 exceeds an optional user-specified threshold (e.g., 30 minutes more than the ideal time or current travel time exceeds two hours total). Generation of the alert would be a result of the routing engine continuously calculating congestion and travel times relative the user's selected route 890. Such an alert may be sent to, for example, a cellular phone utilizing SMS or to a user's computer via an automatically generated e-mail message. Once the user is alerted as to the change in traffic conditions and/or travel time, the selected route 890 may be altered (e.g., selection of the fastest route).

An alert interface 1000 is illustrated in FIG. 10A. A user is first offered the choice of a particular device 1010 where the alert is to be sent. This drop-down menu may list a variety of devices such as 'cell; 'computer', 'PDA,' pager' and so forth. The user is then offered the choice of determining to which route 1020 the alert will pertain. For example, a user may only be concerned with the travel route home from work so that they may be home in time for a family event. Routes 1020 as reflected in this drop-down menu would correspond to those routes 710 previously referenced in FIG. 7. The user is further given the option of receiving alerts as they pertain to traffic conditions on particular days 1030 and between particular times 1040 through a series of check boxes and drop-down menus, respectively. The user is further given the option to determine whether to be alerted as to particular incidents 1050 or changes in travel speed 1060.

For example, particular incidents 1050 may be associated with severe incidents that might block a lane of traffic (e.g., an overturned semi) or of any and all incidents (e.g., stalled cards and/or minor fender benders). Alternatively, a user may wish to be alerted as to changes in travel speed 1060 regardless of the cause (i.e., the particular incident 1050 causing the delay). In these instances, the user may wish to be alerted whenever their travel time changes by a particular time.

Figure 10B:
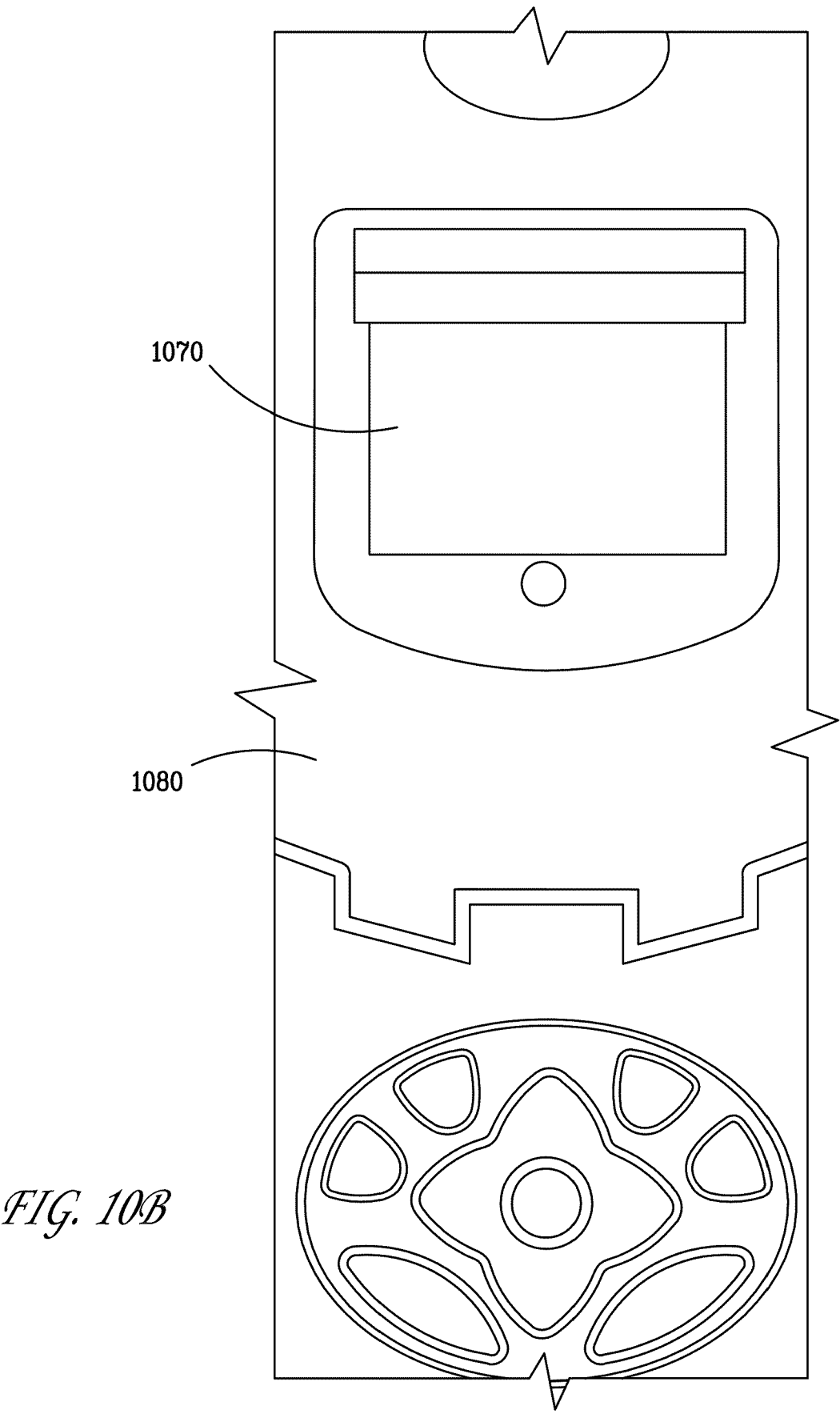
FIG. 10A illustrates an exemplary interface for generating a traffic alert.
FIG. 10 B illustrates an exemplary mobile device having received an exemplary SMS traffic alert.

FIG. 10B illustrates an exemplary SMS message 1070 sent to a cellular device 1080, the message reflecting that the route identified as <work2home> has increased in travel time by a total of six minutes.

Further embodiments of the present invention allow for animated road traffic reports whereby realistic traffic animation based on real-time flow and incidents are displayed to a user. Such animated road traffic reports may be mapped on satellite imagery in conjunction with the publishing system described herein. An exemplary animated road traffic report 1100 is illustrated in FIG. 11A.

Figure 11A:
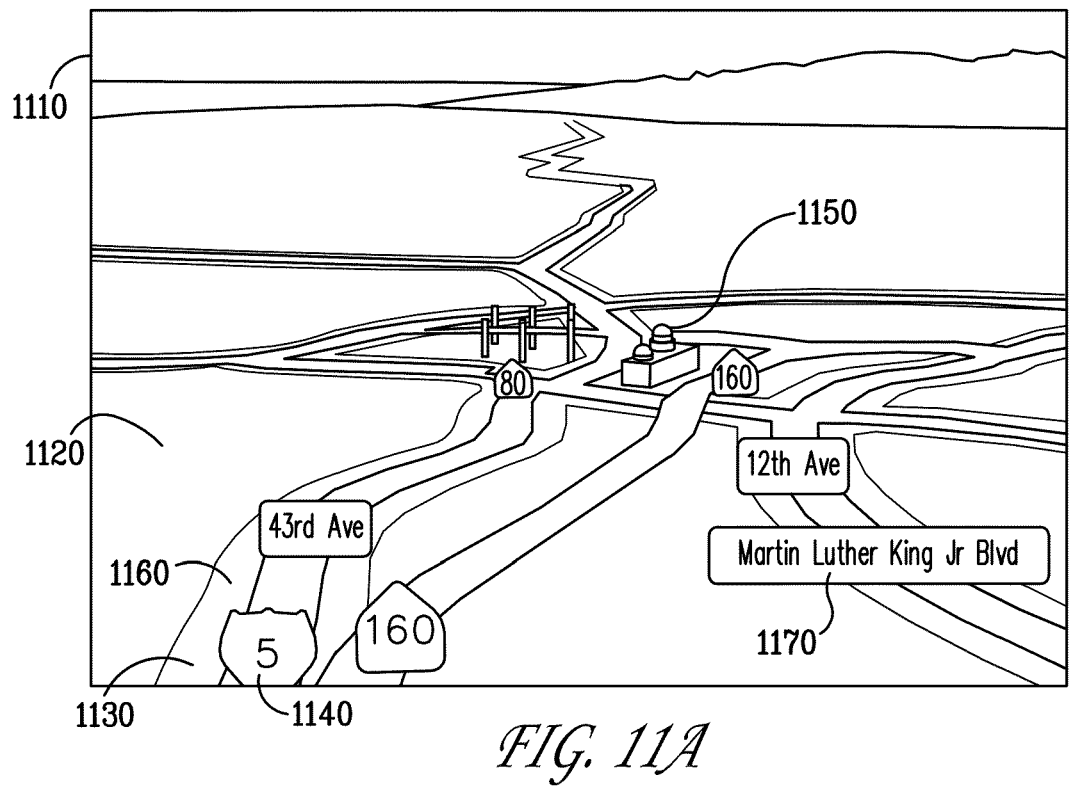
FIG. 11A illustrates an exemplary animated road traffic report.

The exemplary animated road traffic report 1100 illustrated in FIG. 11A comprises satellite images 1110 of a traffic area 1120. Traffic area 1120 may be, for example, a particular intersection of roads, highways or other transportation thoroughfares (e.g., train or subway tracks); a particular area surrounding a city (e.g., a 20-square mile area surrounding Sacramento, Calif.); or a particular traffic 'hot spot' (e.g., a section of highway undergoing construction). Traffic areas may also be artificial areas of particular focus at a particular time. For example, a traffic area may begin as the aforementioned 20-square mile area surrounding Sacramento but may be enlarged/focused in with regard to a particular region in that 20-square mile region (i.e., an enlarged area allowing for increased viewing ease). Traffic areas 1120 are referenced in a non-restrictive sense and are meant to include any particular area wherein particular traffic patterns may be of present interest.

Satellite images 1110 of the traffic area 1120 may be acquired from any variety of sources. For example, satellite imagery may be obtained from a proprietary satellite orbiting the Earth. Satellite imagery may also be obtained directly from commercial satellites orbiting the Earth. Satellite imagery may also be obtained from commercial vendors with access to satellite equipment. Satellite imagery may also be obtained from, for example, government entities such as the U.S. Geological Survey or U.S. Department of Defense. The particular source of satellite imagery is irrelevant so long as the satellite images 1110 of a particular traffic area 1120 allow for the overlay of traffic animation.

Satellite image 1110 may be of varying detail. For example, certain satellite images 1110 may provide detailed geographic information or simply provide the most fundamental of satellite images. Satellite images may also be manipulated to aid in generating three-dimensional information. For example, one-dimensional satellite images 1110 may be processed in the context of other geographical information (e.g., altitude information) to generate a three-dimensional satellite image that reflects information along an X-, Y-, and Z-axis like the satellite image 1110 shown in the animated traffic report 1100 of FIG. 11A.

Animated traffic report 1100 further comprises thoroughfare images 1130. Thoroughfare images 1130 are computer-enhanced images that follow the natural path of real-world traffic thoroughfares (e.g., roads, highways, subway, train, etc.). The textured three-dimensional representation of landscape of the particular traffic area 1120 aligns with and provides the three-dimensional coordinates for the roads (i.e., a thoroughfare) that are animated and overlaid on the satellite image 1110.

For example, animated traffic report 1100 illustrates a thoroughfare image 1130 of Interstate Highway 5. This computer-enhanced image aids the viewed with regard to identifying, highlighting and following the course of Interstate 5 in that the satellite image 1110 by itself may not provide a clear view of the highway, which may be the result of poor imaging, cloud cover or other atmospheric anomalies (e.g., smog or haze) or as may occur due to natural geographic formations (e.g., a road traversing a mountain and the particular angle of the satellite image not allowing for a top-plan view of the particular thoroughfare) or manmade formations (e.g., tunnels through a mountain range). In some embodiments of the present invention, especially those with high-quality satellite images 1110, thoroughfare images 1130 may not be necessary.

Animated traffic report 1100 may also comprise thoroughfare identifiers 1140. Thoroughfare identifiers 1140 identify particular thoroughfares or thoroughfare images 1130. For example, Interstate 5 is identified through a graphical representation of a readily recognized Interstate highway sign with the appropriate highway number applied to the sign. Similarly, California State Highway 160 is identified by a thoroughfare identifier 1140 resembling a readily recognized California state highway sign with the appropriate highway number applied to the sign. Smaller thoroughfares (e.g., city streets, exits, specially named sections of highways or city streets) may also be associated with a thoroughfare identifier 1140.

Thoroughfare identifiers 1140 may be rendered in such a way that they resemble a street or highway sign that might be found in the real-world relative the particular thoroughfare. Thoroughfare identifiers 1140 need not be limited to any particular format and may be adjusted to resemble the particular signage format of a particular state or region or any other format as may be desired by a party operating the present system.

Animated traffic report 1100 may also comprise structure identifiers 1150. Structure identifiers 1150 are graphic representations of certain structures within the traffic area 1120. For example, in FIG. 11A, the Sacramento Capital Building and the Tower Bridge are rendered in the traffic area 1110 as structure identifiers 1150. Structure identifiers 1150 aid in providing context to the traffic map and various thoroughfares in addition to improving the graphic realism of the animated road traffic report 1100. For example, if a user were informed that there exists a particular traffic condition on State Highway 160, this information is generally useless absent some sort of relative positional context. If the user is shown the same traffic condition but near a structure identifier 1150 representative of the State Capitol, this information may be of use to the user should they need to travel to or near the state capitol building.

In an exemplary animated road traffic report 1100, roads and thoroughfares are decomposed into segments and the average real-time speed of traffic as provided by the various data sources of the present invention are mapped to the segment. For example, Interstate 5 may constitute a road segment. Further, particular portions of Interstate 5 may constitute a road segment (e.g., the area between exit X and Y may constitute a first segment and the area between exit Y and Z may constitute a second segment). These road segments are then color coded 1160 relative particular traffic data for that road segment.

For example, the southbound traffic area between $12^{th}$ Avenue and Martin Luther King Boulevard as illustrated in the present animated road traffic report is color coded red indicating slow traffic. Northbound I-5, however, is color coded green indicating free moving traffic. Meanwhile, a portion of I-80 is color coded orange indicating a mild slow down but not to the extent of, for example, the slow down between $12^{th}$ Avenue and Martin Luther King Boulevard, which is more indicative of an accident. In some embodiments of the present invention, traffic, too, is color coded 1170.

The visualization of traffic conditions in the present animated road traffic report 1100 combines a traffic model, the current state of traffic, as provided with speed measurements for the road segments and a three-dimensional representation of landscape comprising topography textured with satellite or aerial imagery, as well as three-dimensional landmarks.

Figure 11B:
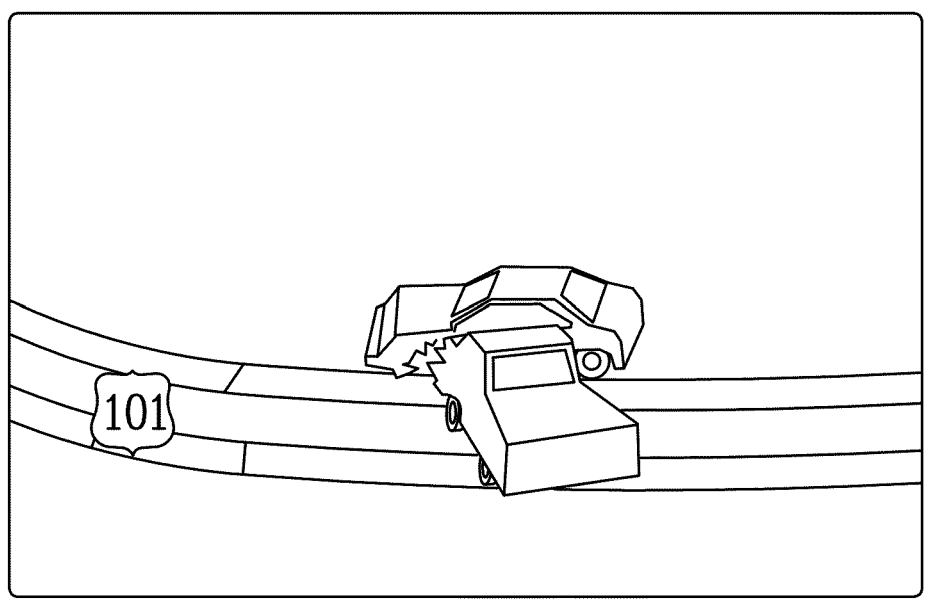
FIG. 11B illustrates exemplary three-dimensional representations of vehicles as may be implemented in the road traffic report for FIG. 11A.

The traffic model comprises a number of vehicles, which may be represented abstractly such as through using triangles in FIG. 11A or using faithful three-dimensional representations of a car like those shown in FIG. 11B. The vehicles are initially positioned along the road segments proportionally to the density of traffic if known. For each frame of the animation, each vehicle's position, speed and acceleration are being updated. Each vehicle's new acceleration is determined by the vehicle's current state, the current state of traffic for the segment where the vehicle is located, and the acceleration, speed and position of the vehicle ahead.

During the three-dimensional animated, certain rules are applied. First, if the distance to the next vehicle is less than a following distance, and the vehicle is moving faster than the next vehicle then the vehicle visually decelerates. If the speed is otherwise below the segment speed, the vehicle visually accelerates. If the speed is above the segment speed, the vehicle visually decelerates. In all other instances, there is no change in speed.

Acceleration and deceleration are computed by mitigating average acceleration and deceleration with vehicle-specific random factors. Because real traffic has a random component, this randomization provides a realistic appearance to the traffic model and the resulting visualization.

The traffic model is adapted to comply with the current traffic conditions whereby each vehicle's color is set to match the color of the road segment on which it currently is located. Each vehicle's speed is influenced in the model so as to match the segment's speed as soon and as accurately as possible.

Vehicle's depicted in the animated traffic report 1100 may also be 'squashed' and 'stretched' proportionally to correspond to acceleration or deceleration of the vehicle. These proportional adjustments are visually intuitive with regard to the process of backing up to comply with a specific speed.

In yet another embodiment of the present invention, real-time traffic data maybe combined with various routing capabilities to determine travel times of common and alternative routes. In this manner, mapping, routing, and personal preferences may be integrated to enable efficient archiving and time-series forecasting such that the travel time for a particular route or series of routes may be forecast based upon observed conditions and other factors.

Through observing the mapping of common incidents and traffic flow, incidents are qualified with respect to the current travel time on a route where the incident occurs and in the vicinity of the incident. A determination of whether the travel time is significantly affected from usual travel conditions over that route is also made.

In the instance that an incident is determined to significantly affect travel time, an embodiment of the present invention identifies or promotes that incident to 'significant incident' status. The significant incident may be highlighted graphically and/or reported to users via, for example, e-mails, SMS messages and the like. Significant incidents may also be reported to traffic broadcasters in order to disseminate that data to drivers who may not subscribe to the present system (e.g., via a radio broadcast).

Figure 12:
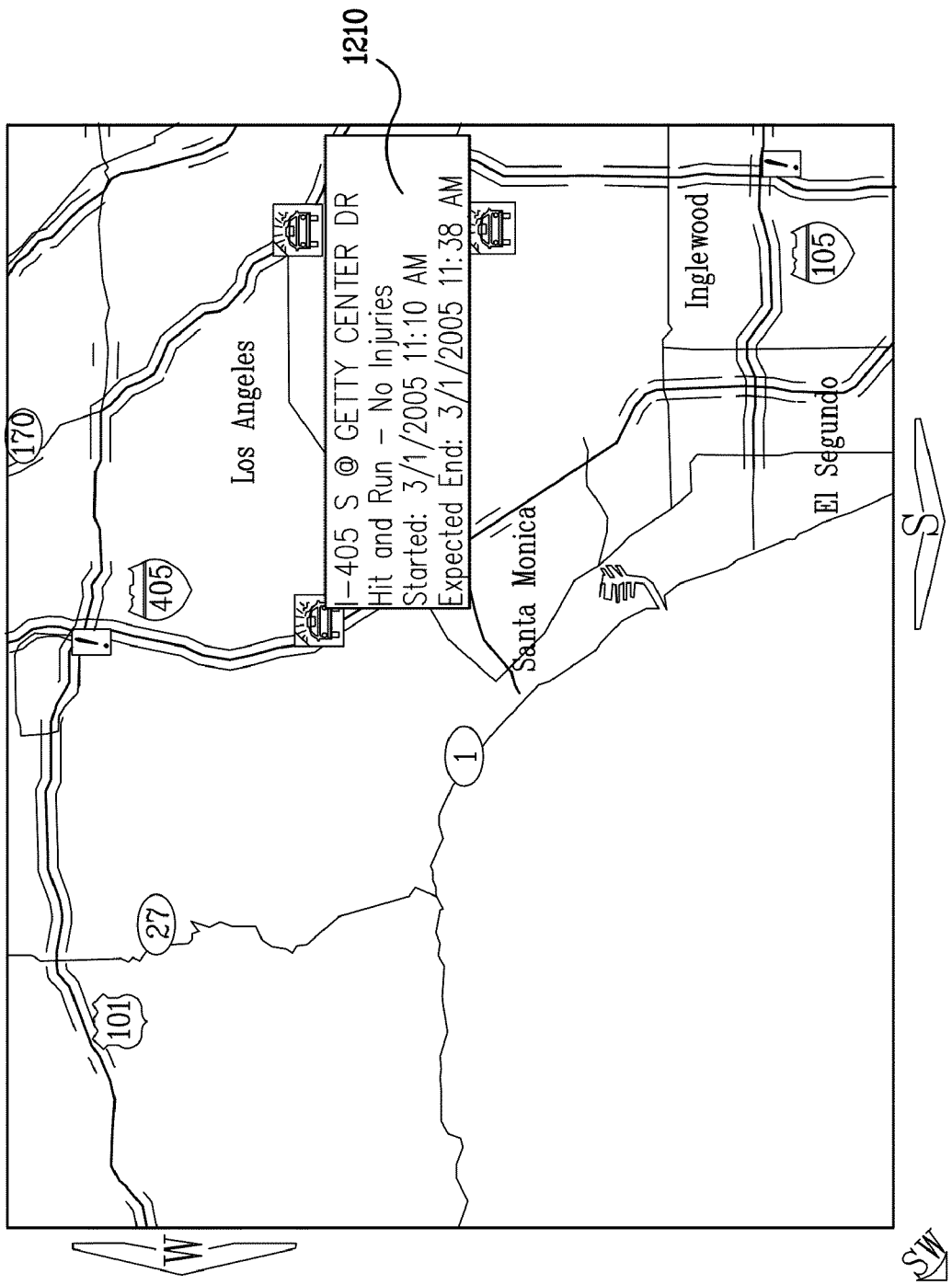
FIG. 12 is an exemplary graphic interface highlighting a significant incident.

FIG. 12 is an exemplary graphic interface 1200 highlighting a significant incident 1210. The hit-and-run incident reported at the intersection of I-405S and Getty Center Drive has been promoted to 'significant status' as a result of the present system having correlated a slowdown in traffic patterns relative the reported incident. These traffic patterns may be identified from a single source or a plurality of sources.

An embodiment of the present invention will periodically review the traffic patterns relative to the significant incident 1210 and determine whether the incident still affects travel time. If the incident is no longer adversely affecting travel time—adversity being a variable determinable by a user of the present system—the incident may be demoted to regular status and is no longer displayed on interface 1200, nor are reports delivered to users or other individuals. The nature of the incident, the period of time the incident affected travel flows and the degree to which traffic was affected may all be recorded in a traffic database.

With regard to generating traffic forecasts and trip advice, an embodiment of the present invention may access a data archive whereby recently observed traffic conditions are allocated to segments of road or highway. Utilizing this data format, a profile of trip duration for a given route may be generated for a specific time period, for example, seven days. This forecast may be based on recent history of speeds over the route or particular segments of the route as well as other facts such as weather forecasts and holiday traffic.

The travel time forecast may integrate speed forecasts for the entire duration of the trip as opposed to a forecast generated only at the trip start time. For example, an embodiment of the presently described travel time forecast may relate to a trip starting at 3 pm and lasting 100 minutes (i.e., 100 minutes of travel time). Instead of calculating only traffic value as they exist at 3 pm, the present invention will consider traffic speed forecasts from 3 pm to 4:40 pm and apply those forecasts to the relevant highway or road portions as they relate to the specific route to be traversed by a user of the present system.

The presently described forecasting embodiment stores an array of speed for, for example, ten minute intervals for each day of the week for each road segment in each direction of travel. In an embodiment of the present invention utilizing ten minute intervals, 2016 values would be allocated. As these are predicted speed values, the allocation of a full precision floating point number is not necessary. Data is recorded only for segments that have speed sensors other speed data determining means (e.g., toll tags). If a speed value is not readily available, a default value may be utilized, the default value being calculated relative to surrounding speed values or subject to a manual setting.

Based on the particular route selected by the user, a number of road segments will be identified. The forecast engine of the present invention will then generate a table of travel times for the route for each 144 ten minute interval (i.e., 24 hours broken into 60 minutes further broken into 10 minute segments—(24*60)/10—in each day of the seven day week. The result is a table of 1008 pieces of unique routing information.

Figure 13:
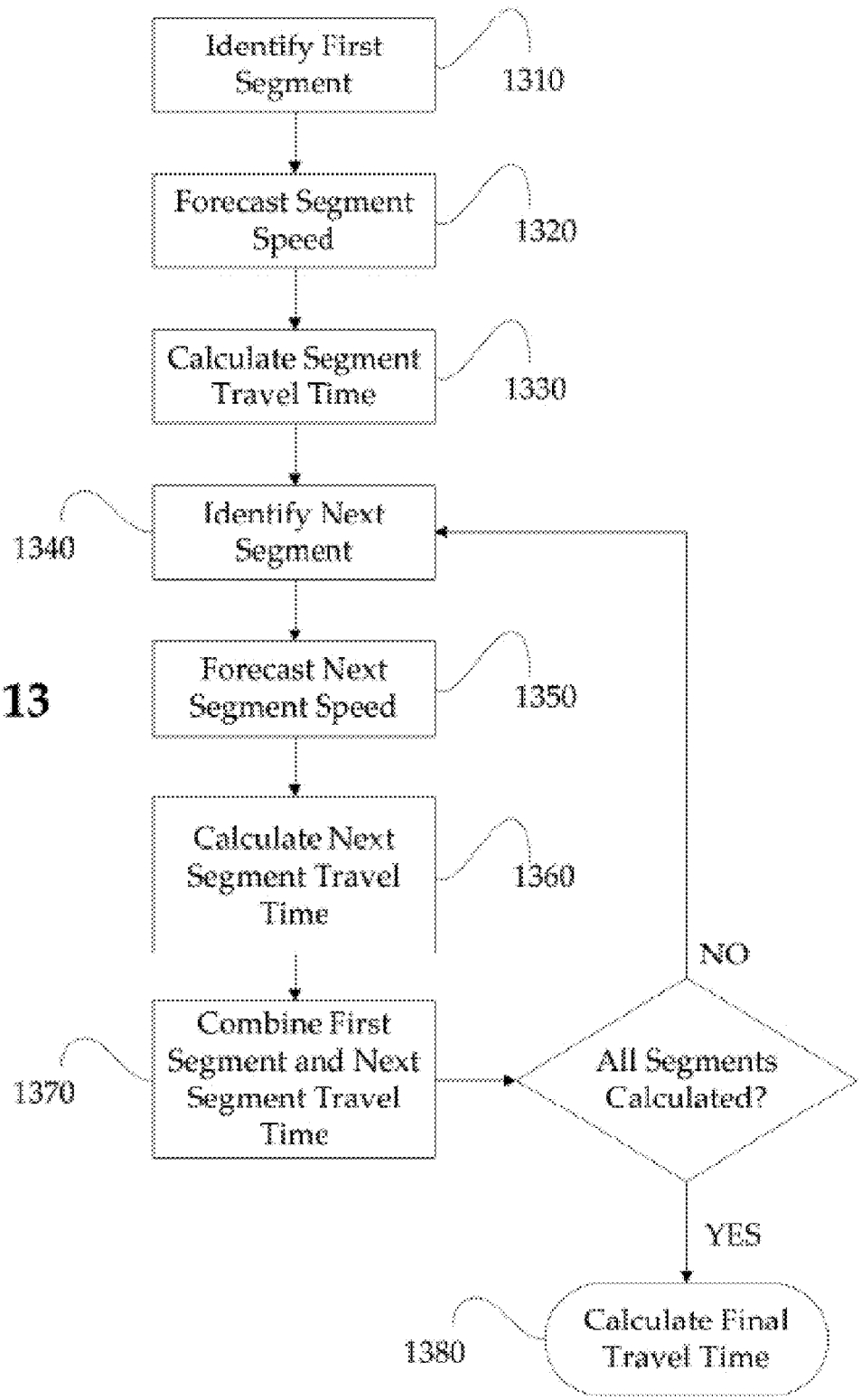
FIG. 13 is a flow chart illustrating an exemplary process of preparing a travel time forecast.

As shown in FIG. 13, for each element of routing information, a first segment is identified in step 1310 and a speed is forecast for the ten minute interval in step 1320. The travel time on that particular segment is then calculated in step 1330. The next segment in the route is then identified in step 1340 and a speed is forecast for that segment using the appropriate ten minute interval, not earlier than the current ten minute interval, and, depending upon the time of day when that segment is reached, the next incremental ten minute interval in step 1350. The travel time for this second segment based on the particular increment of the ten minute interval is then identified in step 1360. The travel time for the first segment is then added to the travel time for the second segment in step 1370. The result is repeated until a travel time has been allocated to each segment along the entire route and a final travel time is calculated (step 1380).

Through this incremental speed-to-road segment determination, travel patterns may be identified and illustrated graphically whereby users may plan travel around peak times in order to optimize travel.

Figures 14, 14A, 14B:
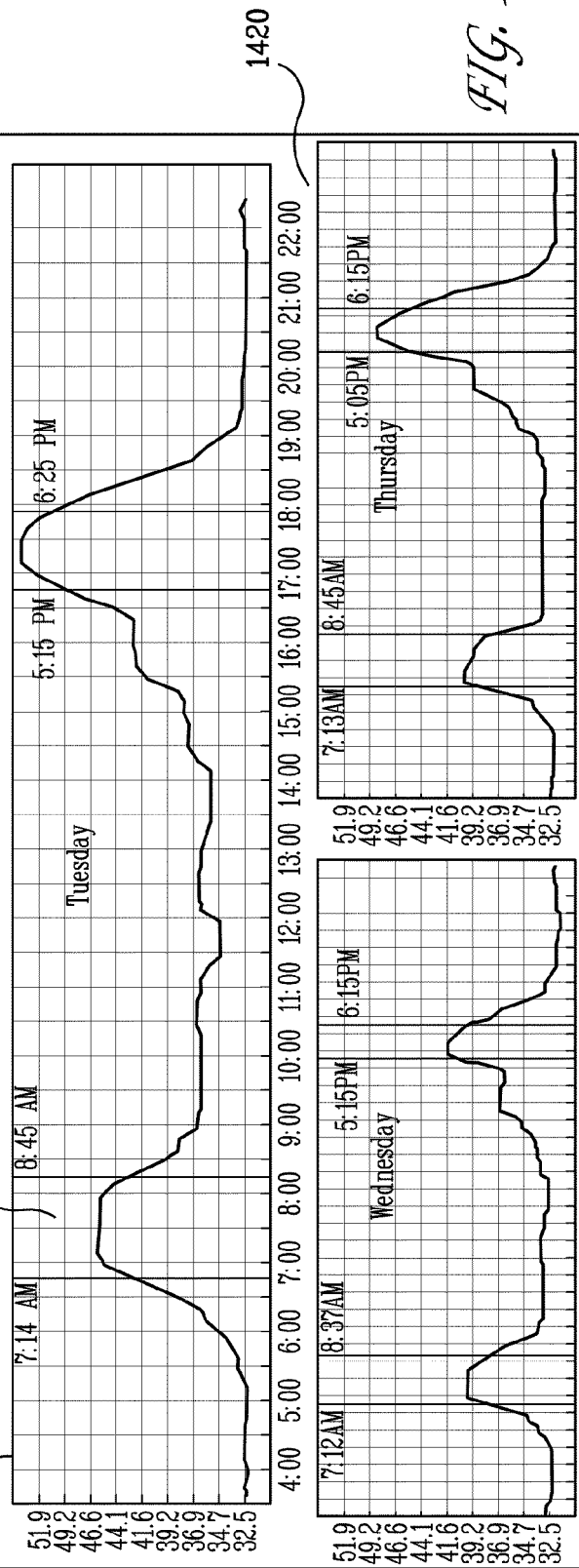
FIGS. 14A and 14B illustrate an exemplary travel time forecast.
Figure 14B:
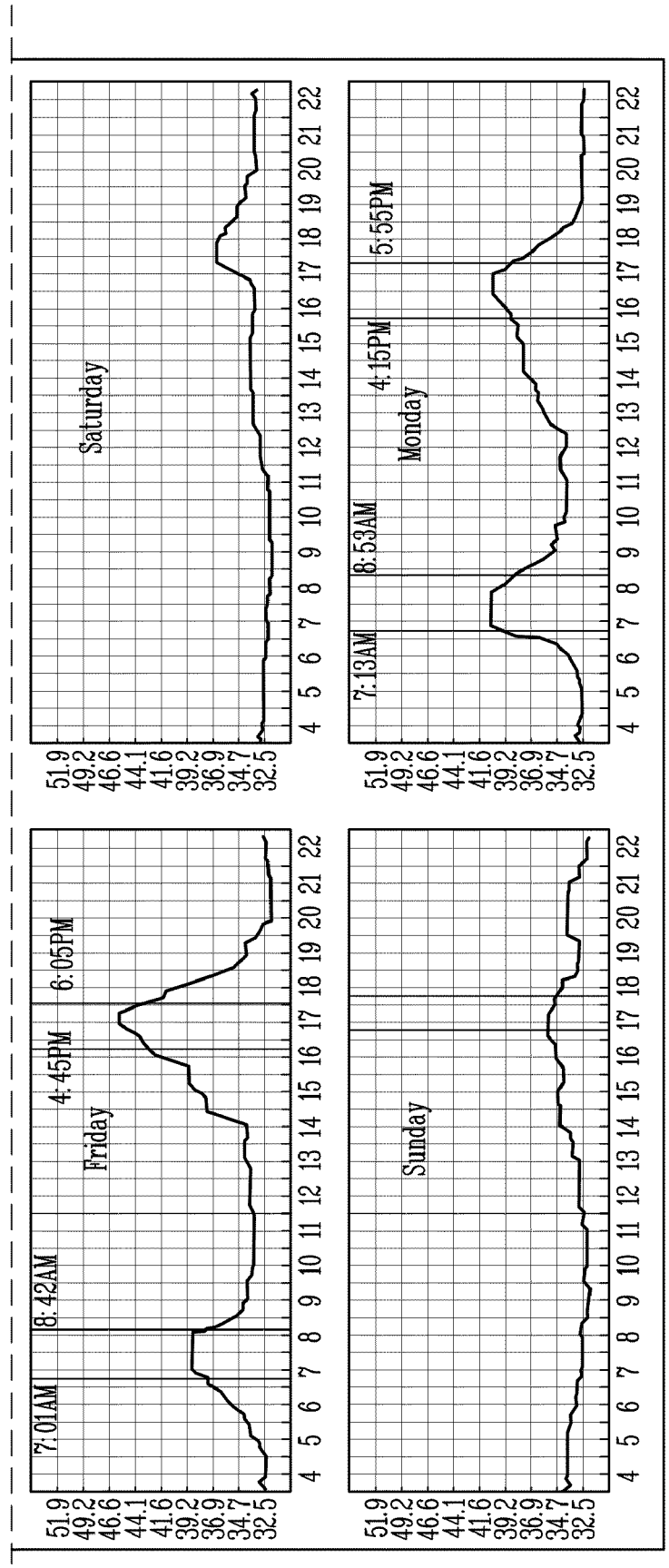

FIGS. 14A and 14B illustrate an exemplary travel time forecast 1400 for a particular route, specifically from Oakland, California, to Palo Alto, Calif., utilizing the aforementioned methodology. Travel time 1410 is reflected along the y-axis whereas time of day is reflected along the X-axis 1420. As can be seen by peak-traffic highlighting 1430, commencing travel from Oakland to Palo Alto between the times of 7.14 am and 8.45 am is not advised.

In one embodiment of the present invention, significant peaks of travel time may be identified through a criterion wherein the maximum travel time in the graph exceeds the minimum by a predetermined ratio, for example, 25%. If the minimum is exceeded by the aforementioned ratio, then the travel time graph will accumulate temporal interest, on a graph, a horizontal line with a valuation equal to the peak value less X % of that value. In one embodiment of the present invention, X is equal to 10. The resulting intersection is a sequence of pair values wherein each value pair determines a peak driving time (e.g., avoid driving a particular route between a start and finish time).

If the two peak times are close to one another for a relatively temporary period of time, they may be combined into a single peak. For example, a peak driving time of 4.40 to 5.50 and 6.00 to 6.24 may be combined into a single peak driving time of 4.40 to 6.24 because the peak driving times are otherwise ten minutes apart. The temporary period of time leading to a combination of peak times may be set by a user of the system.

One skilled in the art will recognize that the Traveler Information Dissemination system 10 as disclosed herein is susceptible to many variations and additional embodiments not described herein. Therefore, it is considered the teachings herein are only illustrative of the invention, and not limiting of the invention in any way. For example, new traffic patterns may be recorded and observed utilizing the methodologies described herein.

What is claimed is:

1. A traveler information dissemination system, comprising:
    a traveler information selection utility for storing user criteria organized by location codes;
    at least one data source for providing current data relating to traveling conditions;
    memory storing computer readable instructions that are executable by a processor to generate a route creation interface on a display device, the route creation interface:
        presenting a route creation interface to a user, the route creation interface generated by a publishing system;
        displaying a map populated with points for selection by the user;
        receiving a user selection of at least two points from the map, wherein a first point is a start point and a second point is an endpoint; and
    a routing engine stored in memory and executable by a processor to:
        compute a route from the first point to the second point;
        determine a travel time for the route, wherein the determination includes compounding weights of segments composing the route, the weights derived from one or more data sources, and
        display the route on the map.

2. The system of claim 1, wherein the route is the shortest route with respect to distance.

3. The system of claim 1, wherein the route is the fastest route with respect to time.

4. The system of claim 1, wherein the weights include an ideal speed.

5. The system of claim 1, wherein the weights include a speed from real-time congestion.

6. The system of claim 1, wherein the weights include a speed from predicted congestion.

7. The system of claim 1, wherein the determination further includes a consideration of a history of speeds over the route.

8. The system of claim 1, wherein the determination further includes a consideration of the effect of a weather forecast on the route.

9. The system of claim 1, wherein the determination further includes a consideration of the effect of holiday traffic on the route.

10. The system of claim 1, wherein computing the route from the first point to the second point includes a consideration of a historical speed value corresponding to a current time of day.

11. The system of claim 1, wherein computing the route from the first point to the second point includes a consideration of real-time speed information.

12. The system of claim 1, wherein computing the route from the first point to the second point includes a consideration of predictive speed.

13. The system of claim 1, wherein the execution of instructions by the processor further sends an alert to a user when a delay in the route exceeds a travel time threshold previously specified by the user.

14. The system of claim 13, wherein the alert is an e-mail message.

15. The system of claim 13, wherein the alert is sent via Short-Message Service (SMS).

* * * * *